(12) United States Patent
Shinzaki

(10) Patent No.: US 7,395,088 B2
(45) Date of Patent: Jul. 1, 2008

(54) MOBILE ELECTRONIC APPARATUS, AND BATTERY PACK FOR THE APPARATUS

(75) Inventor: Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 541 days.

(21) Appl. No.: 09/811,655

(22) Filed: Mar. 20, 2001

(65) Prior Publication Data
US 2001/0039199 A1 Nov. 8, 2001

(30) Foreign Application Priority Data
Apr. 28, 2000 (JP) ............................. 2000-129616

(51) Int. Cl.
H04M 1/00 (2006.01)
(52) U.S. Cl. .................... 455/556.1; 455/90.3; 455/557
(58) Field of Classification Search ................ 455/557, 455/556.1, 556.2, 41.2, 41.3, 575.2, 575.6, 455/569.1, 569.2; 713/155, 186; 382/115, 382/189
See application file for complete search history.

(56) References Cited

U.S. PATENT DOCUMENTS

| | | | | |
|---|---|---|---|---|
| 5,479,479 A | * | 12/1995 | Braitberg et al. | 455/404.1 |
| 5,959,260 A | * | 9/1999 | Hoghooghi et al. | 178/18.03 |
| 6,069,588 A | * | 5/2000 | O'Neill, Jr. | 343/713 |
| 6,115,616 A | | 9/2000 | Halperin et al. | 455/557 |
| 6,195,568 B1 | * | 2/2001 | Irvin | 455/563 |
| 6,212,403 B1 | | 4/2001 | Ushiroda | 455/557 |
| 6,411,823 B1 | * | 6/2002 | Chen | 455/559 |
| 6,477,274 B1 | * | 11/2002 | Kim et al. | 382/187 |
| 6,477,391 B1 | * | 11/2002 | Muramatsu et al. | 455/550.1 |
| 6,505,055 B1 | * | 1/2003 | Kahn et al. | 455/564 |
| 6,560,468 B1 | * | 5/2003 | Boesen | 455/569.1 |
| 6,681,121 B1 | * | 1/2004 | Preston et al. | 455/556.1 |
| 6,697,638 B1 | * | 2/2004 | Larsson et al. | 455/553.1 |
| 6,873,863 B2 | * | 3/2005 | Hiltunen | 455/575.1 |
| 7,200,419 B2 | | 4/2007 | Shinzaki | 455/556.1 |

OTHER PUBLICATIONS

U.S. Appl. No. 10/922,833, filed Aug. 23, 2004, Shinzaki, Fujitsu Limited.

* cited by examiner

Primary Examiner—George Eng
Assistant Examiner—Sam Bhattacharya
(74) Attorney, Agent, or Firm—Staas & Halsey LLP

(57) ABSTRACT

A mobile electronic apparatus in which various functions can be easily added without impairing the mobility and without making any change in the hardware. The mobile electronic apparatus is carried by its authorized user to perform various types of electrical information processing, and has an attachment part detachably attached to a main body of the apparatus for performing a predetermined function, which attachment part has an input/output section for inputting/outputting information. The apparatus also has an interface section for transferring input/output signals relating to the information between the attachment part and the main body. The invention is applicable in mobile electronic apparatus having an attachment part detachably attached thereto, internet appliances such as cell phones, mobile electronic information terminals, and PDAs.

9 Claims, 15 Drawing Sheets

MOBILE ELECTRONIC APPARATUS, AND BATTERY PACK FOR THE APPARATUS

BACKGROUND OF THE INVENTION

1. Field of the Invention

The present invention relates to mobile electronic apparatus (e.g., internet appliances such as cell phones, mobile electronic information terminals, and Personal Digital Assistants (PDAs)) having an attachment part (battery pack, etc.) detachably attached to the electronic apparatus and also relates to a battery pack for the electronic apparatus.

2. Description of the Related Art

Multifunctional mobile electronic apparatus (various types of potable electronic information terminals and cell phones) nowadays not only function as electronic notepads or telephones but also receive/transmit electronic information and image information via wired/wireless networks. Further, such mobile electronic apparatus can also be used in bank account settlement, electronic commerce, or securities trading. For realizing these varying functions in one mobile electronic apparatus, various types of applications are started or executed in the mobile electronic apparatus.

When such applications are started or executed in the mobile electronic apparatus, an ID and a password must be input for each application. Likewise, when bank account settlement or electronic commerce is made, a bank account number and a personal identification number (PIN) must be input.

In general, ID and bank account number are previously stored in a memory or the like so that the user is unnecessary to input such numbers by himself/herself, while the password and the PIN must be input by the user with push or touch buttons (ten keys) for verifying the user.

Further, mobile electronic information terminals, cell phones in particular, nowadays serve as phone books and communicators for sending and receiving electronic-mail messages. In conventional apparatus, phone-book data or electronic-mail massages are input by the user with push or touch buttons (ten keys). As provided originally for the purpose of inputting telephone numbers, such touch buttons are inconvenient in use for inputting letters or characters because some troublesome procedures, namely, pressing the same key several times, are required.

As described above, user verification is carried out by inputting passwords or personal identification numbers (PINs) in the conventional mobile electronic apparatus. Yet many of users tend to use a string of characters or digits that are relevant to their personal peripheral data (for example, the user's or family member's name or birthday, telephone number, favorite word, etc.) as a password or a PIN. Assuming that a mobile electronic apparatus with such passwords or PINs registered is stolen or lost, it is a danger that an unauthorized person might use the apparatus in an evil purpose. Therefore a mobile electronic apparatus with increased security has been cherished.

To resolve this problem, user verification with use of biometric information such as a fingerprint has ever been tarried. As a practical matter, however, it is difficult to introduce such user verification function utilizing biometric information into a huge number of existing mobile electronic apparatus already been widely spread. For instance, if biometric user verification is performed in plural systems, devices and software corresponding to individual types of operation systems are required. In view of cost, however, it would be difficult to provide such devices and software to all those systems.

Despite of the great convenience realized by the function of bank account settlement, electronic commerce, or stock trade equipped in the convention mobile electronic apparatus, there remains a serious problem of poor security. Moreover, because of poor extendability of mobile information terminals, cell phones in particular, it is difficult to add any form of user verification function afterward. Accordingly, in order to realize biometric verification in a mobile electronic apparatus, not an add-on to the mobile electronic apparatus but an independent device for user verification that works in association with the mobile electronic apparatus has been cherished.

Furthermore, in the conventional mobile electronic apparatus, cell phones in particular, because of the use of touch buttons (ten keys), which are originally provided to be used in inputting telephone numbers, in inputting letters or characters, troublesome procedures are necessitated thereby requiring a long time. So, further expansion of the I/O function has long been desired.

For this, there has been longed for an easy way of expansion of the I/O function in existing mobile electronic apparatus, making the apparatus more user-friendly. It is also desired to provide the user verification function of great importance to the existing mobile electronic apparatus in a simple way.

When introducing an additional function into the mobile electronic apparatus such as cell phones and mobile electronic information terminals, an additional apparatus to execute the additional function tends to be connected to the mobile electronic apparatus via a cable so that the use of the mobile electronic information terminal is limited to desktop use despite of its name "mobile".

SUMMARY OF THE INVENTION

With the foregoing problems in view, one object of the present invention is to provide a mobile electronic apparatus in which various functions can be added and expanded in a simple manner, without impairing the mobility of the mobile electronic apparatus and without making any change in hardware of a mobile electronic apparatus currently being put on the market, thus improving the user friendliness.

Another object of the invention is to provide a battery pack for the above-mentioned mobile electronic apparatus.

In order to accomplish the above object, according to the present invention, there is provided a mobile electronic apparatus having the following generic features (1) through (6):

(1) the mobile electronic apparatus comprises: a main body; an attachment part detachably attached to the main body for performing a predetermined function when attached to the main body, which attachment part has an input/output section integrally formed with the attachment part for inputting/outputting information (data); and an interface section for transferring input/output signals relating to the last-named information (data) between the main body and the attachment part.

(2) The attachment part may be a battery pack having an input section integrally formed with the battery pack for inputting information (data), which battery pack is detachably attached to the main body for transmitting the input signal input from the input section to the main body via a power supply terminal. As a preferred feature, the battery pack may include a signal synthesizing circuit for carrying the input signals, which are input by the input section, onto a power supply voltage to be supplied from the battery pack to the main body, and the main body may include a signal separating circuit for separating and picking up the input signals carried on the power supply voltage. As a further preferred feature, the main body may have a converting section for converting the input signals, which are separated and picked up by the signal separating circuit, into key-input-pattern signals.

(3) The mobile electronic apparatus comprises: the main body; an attachment part detachably attached to the main body for performing a predetermined function when attached to the main body; an input section, formed integrally with the attachment part, for measuring biometric information of an object person to be verified and inputting the measured biometric information; an extracting section, which is formed integrally with the attachment part and operatively connected with the input section, for extracting biometric feature information from the biometric information, which is measured and input by the input section, for verification of the object person; and an interface section, disposed between the main body and the attachment part, for sending the biometric feature information from the extracting section to the main body.

(4) The mobile electronic apparatus comprises: a main body; an attachment part detachably attached to the main body for performing a predetermined function when attached to the main body; the above-mentioned input section and extracting section formed integrally with the attachment part; a comparing/verifying section, formed integrally with the attachment part and operatively connected with the extracting section, for verifying the object person by comparing the biometric feature information extracted by the extracting section with reference biometric feature information about the authorized user which information is previously obtained; and an interface section, disposed between the main body and the attachment part, for sending the result of verification by the comparing/verifying section to the main body.

(5) The mobile electronic apparatus comprises: a main body; an attachment part detachably attached to the main body for performing a predetermined function when attached to the main body; the above-mentioned input section, extracting section, and comparing/verifying section, formed integrally with the attachment part; a storage section, formed integrally with the attachment part, for storing personal data of the authorized person; a personal data read-out section, formed integrally with the attachment part and operatively connected with the storage section and the comparing/verifying section, for reading out the personal data from the storage section when the biometric feature information of the object person is identical with the reference biometric feature information of the authorized user as the result of verification by the comparing/verifying section; and an interface section, disposed between the main body and the attachment part, for sending to the main body the personal data, which is read out from the storage section by the personal data read-out section.

(6) The attachment part may be a battery pack equipped with the above-mentioned input section, extracting section, comparing/verifying section, storage section, personal data read-out section, and also a signal synthesizing circuit for carrying the personal data, which is read out by the personal data read-out section, onto a supply power voltage from the battery pack to the main body, which battery pack is detachably attached to the main body of the mobile electronic apparatus. And the main body includes: a signal separating circuit for separating the voltage signal carried on the supply power voltage to pick up the personal data; and a converting section for converting the personal data, which is separated and picked up by the signal separating section, into a key-input-pattern signal.

Further, a battery pack for the mobile electronic apparatus, according to the present invention, has the following generic features (7) through (11):

(7) the battery pack is adapted to be detachably attached to a main body of a mobile electronic apparatus which is able to be carried by an authorized user for performing various electronic information processes. The battery pack comprises: a casing adapted to be attached to the main body of the mobile electronic apparatus; a battery received in the casing; an input/output section, formed integrally with the casing, for inputting/outputting information (data); and an interface section, formed integrally with said casing, for transferring input/output signals relating to the last-named information (data) between the input/output section and the main body when the casing is attached to the main body. In this instance, the interface section may further include a signal synthesizing circuit, formed integrally with the casing and operatively connected with the battery, for carrying the input signals, which are input by the input/output section, onto a power supply voltage to be supplied from the battery pack to the main body.

(8) The battery pack has the input section, the extracting section, and the interface section, described above in (3), which sections are integrally formed with the casing of the mobile electronic apparatus.

(9) The battery pack has the input section, the extracting section, the verifying/comparing section, and the interface section, described above in (4), which sections are integrally formed with the casing of the mobile electronic apparatus.

(10) The battery pack has the input section, the extracting section, the verifying/comparing section, the storage section, the personal data read-out section, and the interface section, described above in (5), which sections are integrally formed with the casing of the mobile electronic apparatus.

(11) The battery pack has the input section, the extracting section, the verifying/comparing section, the storage section, the personal data read-out section, and the signal synthesizing circuit, described above in (6), which sections are integrally formed with the casing of the mobile electronic apparatus.

Accordingly, partly since the mobile electronic apparatus of the present invention has the input/output section (keyboard, etc.) for inputting/outputting information (data), formed integrally with the attachment part (replacement part/function part), which is detachably attached to the main body of the apparatus, and partly since input/output signals relating to the data are transferred between the input/output section and the main body through the interface section (for example, an optical communications section, a radio communications section, a connector, an electric contact, and a cable), it is possible to add various types of additional input/output (I/O) functions to an existing mobile electronic apparatus merely by replacing an existing attachment part (replacement part/function part) with an attachment part of the present invention, without the risk of impairing the mobility of the mobile electronic apparatus and without making any modification to hardware, thus resulting in the improved user friendliness.

Moreover, in the mobile electronic apparatus of the present invention, when adding and extending a new I/O function to the apparatus, an input/output section for realizing the additional function can be detachably attached to the main body in an extremely ease way. And also, since the battery pack, which is attached to the main body, has the input/output section integrally formed therewith, it is easy to arrange the interface section between the input/output section and the main body.

Further, partly since the input/output section (keyboard, etc.) for inputting/outputting information (data) is formed integrally with the battery pack to share the battery pack with the main body, and partly since the input signal is transmitted via a power supply terminal (DC terminal) for the battery pack, it is possible to add various types of additional input/output (I/O) functions to an existing mobile electronic apparatus merely by replacing an existing battery pack with the battery pack having the input section of the present invention, without the risk of impairing the mobility of the mobile electronic apparatus and without making any modification to hardware, thus resulting in the improved user friendliness.

In this instance, when adding and extending a new I/O function to the apparatus, the input/output section for realizing the additional function can be detachably attached to the main body in an extremely ease way due to the input section that is formed integrally with the battery pack.

Furthermore, since the input signal from the input section is carried onto a power supply voltage by the signal synthesizing circuit, and is then, on the main body side, separated and picked up from the voltage by the signal separating circuit, the power supply terminal for the battery pack can serve as both a power supply and an interface at the same time, thus making it possible to transmit the input signal from the input section to the main body without using any newly equipped construction. Accordingly, it is resultantly possible to send the input signal from the input section, which serves as a keyboard, camera, tablet, user verifying device, or the like, to the main body, without the need for an interface newly equipped in hardware, or without making any change in the design of the existing mobile electronic apparatus.

Still further, since the input signal, which is separated by the signal separating circuit, is converted by the converting section into a key-input-pattern signal treated in the main body, it is possible to keep the compatibility between the signal from the input section and the signal input through a keyboard originally equipped to the main body, thereby making it possible to treat these signals without discrimination.

In the meantime, the following processes are performed on the battery pack side of the present invention. The input section measures and inputs biometric feature information of an object person to be verified, from which measured and input biometric information the extracting section extracts biometric feature information for verifying the object person. The extracted biometric feature information for user verification is then sent from the battery pack to the main body side via the interface section, thereby enabling the main body to use the thus obtained biometric feature information for user verification.

Therefore, since the biometric user verification can be easily associated with the mobile electronic apparatus merely by replacing an existing battery pack with the battery pack of the present invention having the input section, the extracting section, and the interface section, without the risk of impairing the mobility of the mobile electronic apparatus and without making any modification to hardware, it is possible to most easily add to the conventional mobile electronic apparatus a user verification function that effectively performs various types of verification processes, which have nowadays been introduced into the conventional mobile electronic apparatus, thereby improving the user friendliness.

And further, the following processes are performed on the battery pack side of the present invention. The input section measures and inputs biometric feature information of an object person to be verified, from which measured and input biometric information the extracting section extracts biometric feature information for verifying the object person. After that, still on the battery pack side, the comparing/verifying section compares/verifies the extracted biometric feature information of the object person with reference biometric feature information, and the result of the comparing/verifying is then sent from the battery pack to the main body via the interface section, thereby enabling the main body to execute a corresponding process in response to the result of the verification.

Therefore, since the biometric user verification can be easily associated with the mobile electronic apparatus merely by replacing the existing battery pack with the battery pack of the present invention having the input section, the extracting section, the comparing/verifying section, and the interface section, without the risk of impairing the mobility of the mobile electronic apparatus and without making any modification to hardware, it is possible to provide the conventional mobile electronic apparatus with a user verification function in which various types of verification processes having nowadays been introduced into the conventional mobile electronic apparatus will be effectively performed, thereby improving the user friendliness.

Furthermore, the following processes are performed on the battery pack side of the present invention. Using the input section, the extracting section, and the comparing/verifying section, if it is recognized that the biometric feature information of the object person is identical with the reference biometric feature information of the authorized user, the personal data read-out section reads out the personal data from the storage section. The thus read-out personal data is then sent from the battery pack to the main body via the interface section. With this construction, it is possible to provide the mobile electronic apparatus and the battery pack with the function of storing and managing the personal data of the authorized user by using biometric information.

In other words, it is possible to protect or guard the authorized user's personal data stored in the mobile electronic apparatus by using biometric information, which is free of being stolen or faked. For example, the user must be verified using fingerprint information before sending the personal data to the main body, thereby an access to the personal data is permitted in the main body, thus guaranteeing a highest degree of security.

Therefore, it is possible with ease to associate the storage section protected by the biometric user verification with the mobile electronic apparatus merely by replacing an existing battery pack with the battery pack of the present invention having the input section, the extracting section, the comparing/verifying section, the storage section, the personal data read-out section, and the interface section, without the risk of impairing the mobility of the mobile electronic apparatus and without making any modification to hardware, thereby improving the user friendliness.

And still further, the following processes are performed on the battery pack side of the present invention. If it is recognized that the biometric feature information of the object person is identical with the reference biometric feature information of the authorized user by using the input section, the extracting section, and the comparing/verifying section, the personal data read-out section reads out the personal data from the storage section. After that, still on the battery pack side, the read-out personal data is carried by the signal synthesizing circuit onto a power supply voltage as a voltage signal to be sent from the battery pack to the main body. On the main body side, the signal separating circuit separates and picks up the personal data from the power supply voltage and the converting section converts the separated data into a key-input-pattern signal for the main body. With this construction, it is possible to provide the mobile electronic apparatus and the battery pack with a function of protecting or guarding the authorized user's personal data stored in the mobile electronic apparatus by using biometric information.

In other words, it is possible to protect or guard the authorized user's personal data stored in the mobile electronic apparatus by using biometric information, which is free of being stolen or faked. For example, the user must be verified using fingerprint information before sending the personal data to the main body, whereupon an access to the personal data is permitted in the main body, thus guaranteeing a highest degree of security.

Therefore, it is possible with ease to associate the storage section protected by the biometric user verification with the mobile electronic apparatus merely by replacing an existing battery pack with the battery pack of the present invention having the input section, the extracting section, the comparing/verifying section, the storage section, the personal data read-out section, and the signal synthesizing circuit, without the risk of impairing the mobility of the mobile electronic apparatus and without making any modification to hardware, thus improving the user friendliness.

At that time, since the personal data is carried onto a power supply voltage by the signal synthesizing circuit, and is then, on the main body side, separated and picked up from the voltage by the signal separating circuit, the power supply terminal for the battery pack can serve as both a power supply and an interface at the same time, thus making it possible to transmit the personal data from the input section to the main body with no need for any arrangement made in the construction. Accordingly, it is resultantly possible to add and extend an additional function to the existing mobile electronic apparatus, without the need for an interface to be newly equipped in hardware, or without making any change in the design of the apparatus.

Further, since the personal data, which is separated by the signal separating circuit, is converted by the converting section into a key-input-pattern signal treated in the main body, it is possible to keep the compatibility between the personal data and the signal input through a keyboard originally equipped to the main body, thereby making it possible to treat these signals without discrimination.

As a preferred feature, the battery pack may have the memory section storing previously obtained reference biometric feature information. With this construction, it is possible to discriminate whether or not the object person is the authorized user, whose reference biometric feature information is stored in the memory section.

As another preferred feature, the attachment part/battery pack (replacement part) may have a medium interface section adapted to be operatively connected with a portable memory medium (IC card, etc.) which stores previously obtained reference biometric feature information and also has a feature information read-out section for reading out the reference biometric feature information from the portable memory medium through the medium interface section. With this construction, it is possible to discriminate whether or not the object person is the authorized user, whose reference biometric feature information is stored in the portable memory medium.

As still another preferred feature, the attachment part/battery pack (replacement part) may have a communications section for receiving the reference biometric feature information from an external apparatus. With this construction, it is possible to discriminate whether or not the object person is the authorized user, whose reference biometric feature information is given from the external apparatus.

As a further preferred feature, a battery may be replaceable with another one. With this construction, even when the battery itself becomes wearing out, the user can continue to use the battery pack having a new function by only replacing the battery with another.

Other objects and further features of the present invention will be apparent from the following detailed description when read in conjunction with the accompanying drawings.

DESCRIPTION OF THE PREFERRED EMBODIMENTS

Various preferred embodiments of the present invention will now be described in detail below with reference made to relevant accompanying drawings.

(1) First Embodiment

Figure 1:
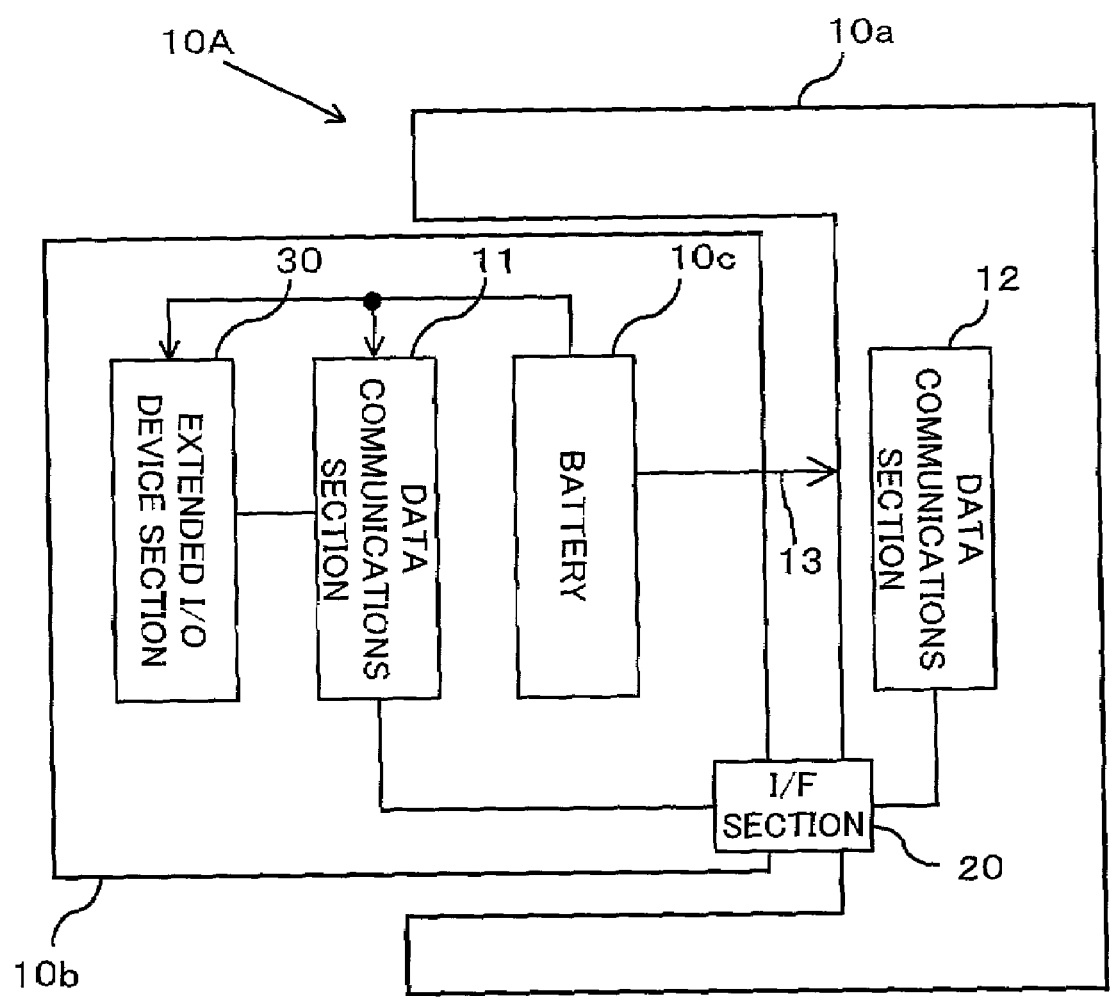
FIG. 1 is a block diagram schematically showing a mobile electronic apparatus of a first embodiment of the present invention.

FIG. 1 shows a mobile electronic apparatus of a first embodiment. The mobile electronic apparatus 10A of the first embodiment, which is carried by an authorized user to perform various processes to various types of electronic information, has a battery power supply casing (battery pack) 10*b*, which is detachablly attached to a main body 10*a* of the apparatus 10A (part for performing a predetermined function). To cite examples in the market, there are internet appliances such as cell phones, mobile electronic information terminals, and Personal Digital Assistants (PDAs) In this instance, the main body 10*a* comprises a CPU, ROM, RAM, LCD, and keys (push/press buttons) (not shown in the drawing), which are interconnected by a bus line.

The power supply casing (hereinafter, also called battery pack) 10*b* has a battery 10*c* lodged therein for supplying electric power to the above-mentioned devices, which are equipped in the main body 10*a*. The electric power of the battery 10*c* is fed from the battery pack 10*b* side to the main body 10*a* side via a power supply terminal 13. And, in the first embodiment, the battery 10*c* is detachable from the battery pack 10*b*.

The battery pack 10*b* has an extended I/O device section (input/output section) 30 formed integrally with the battery pack 10*b*. The extended I/O device section 30 inputs/outputs various data (information) to/from the mobile electronic apparatus 10A and is provided for expanding the I/O function originally given to the main body 10*a*, or for adding additional I/O functions.

Concretely, the followings are examples of the extended I/O device section 30: a keyboard (third embodiment (FIG. 3)), pen tablet, display device (LCD), image-taking device (camera), disk drive, memory device (second embodiment (FIG. 2)), network device, and a user verifying section (fourth embodiment (FIGS. 6 through 18)).

The battery pack 10*b* also has a data communications section 11, which sends data input from the extended I/O device section 30 to the main body 10*a*, and which receives data from the main body 10*a* and then inputs the received data to the extended I/O device section 30.

At that time, electric power is supplied from the battery 10*c* to the data communications section 11 and to the extended I/O device section 30. In other words, in the first embodiment, the data communications section 11 and the extended I/O device section 30 shares the battery 10*c* as a common power source with the main body 10*a*.

The main body 10*a* also has a data communications section 12, which receives data from the battery pack 10*b* (extended I/O device section 30, data communications section 11) and then sends the received data to the CPU or the RAM (not shown).

And, an interface (I/F) section 20, which is disposed between the main body 10*a* and the battery supply casing 10*b*, transfers input/output signals (data communications) between the extended I/O device section 30 (data communications section 11) and the main body 10*a* (data communications section 12).

In use, the followings are examples of the interface section 20: an optical communications section (reference number 21 of FIGS. 2, 7, 8), which receives/sends optical signals as the input/output signals; a radio communications section (reference number 22*a*, 22*b* of FIG. 9), which sends/receives radio signals as the input/output signals; a connector or an electric contact (reference number 23 of FIG. 10), which is connected between the battery pack 10*b* and the main body 10*a*; and a cable (not shown) connecting the extended I/O device section 30 (data communications section 11) and a connector terminal (not shown) of the main body 10*a*.

When extending an I/O function of the mobile electronic information terminal, an additional external apparatus having a new I/O function is normally connected to the mobile electronic information apparatus via a cable so that the use of the mobile electronic information apparatus is limited to desktop use despite of its name "mobile".

In an ordinary mobile electronic apparatus such as a cell phone, a battery pack, which is detachablly mounted to the cell phone, is replaced by another when it becomes wearing out (for example, when the workable time of the battery is very short even after fully recharged).

In the mobile electronic apparatus 10A of the first embodiment (also in the mobile electronic apparatus 10B, 10C, 10D, 10D-1 through 10D-5 of the embodiments described later), the extended I/O device section 30 for realizing a new I/O function or extending the present input/output function of the main body 10*a*, is formed integrally with the battery pack 10*b*, which is detachably attached to the main body 10*a*, thereby making the extended I/O device section 30 also attached to the main body 10*a*.

At this state, data communication is performed between the extended I/O device section 30 and the main body 10*a* via the interface section 20.

Therefore, it is possible to add and extend various types of user-expected I/O functions to an existing mobile electronic apparatus in a simple manner, namely, only by replacing an existing battery pack, which is detachably attached, with another battery pack 10*b* to which the extended I/O device section 30 for realizing the expected I/O function is equipped, without the risk of impairing the mobility of the mobile electronic apparatus 10A and without making any modification to hardware of the main body 10*a* of the mobile electronic apparatus 10A, thus improving the user friendliness in a great degree.

Further, the extended I/O device section 30 formed integrally with the battery pack 10*b*, which is attached to the main body 10*a*, also facilitates the preparation of the interface section 20 between the extended I/O device section 30 and the main body 10*a*.

Furthermore, since the battery 10*c* is shared as a power source among the data communications section 11, the extended I/O device section 30, and the main body 10*a*, it is unnecessary to prepare another power supply dedicated for the extended I/O device section 30.

Still further, since only the battery 10*c* is detachable from the battery pack 10*b*, the user can continue to use the battery pack having the extended I/O function by only replacing the battery 10*c* with another even when the battery itself becomes wearing out.

(2) Second Embodiment

Figure 2:
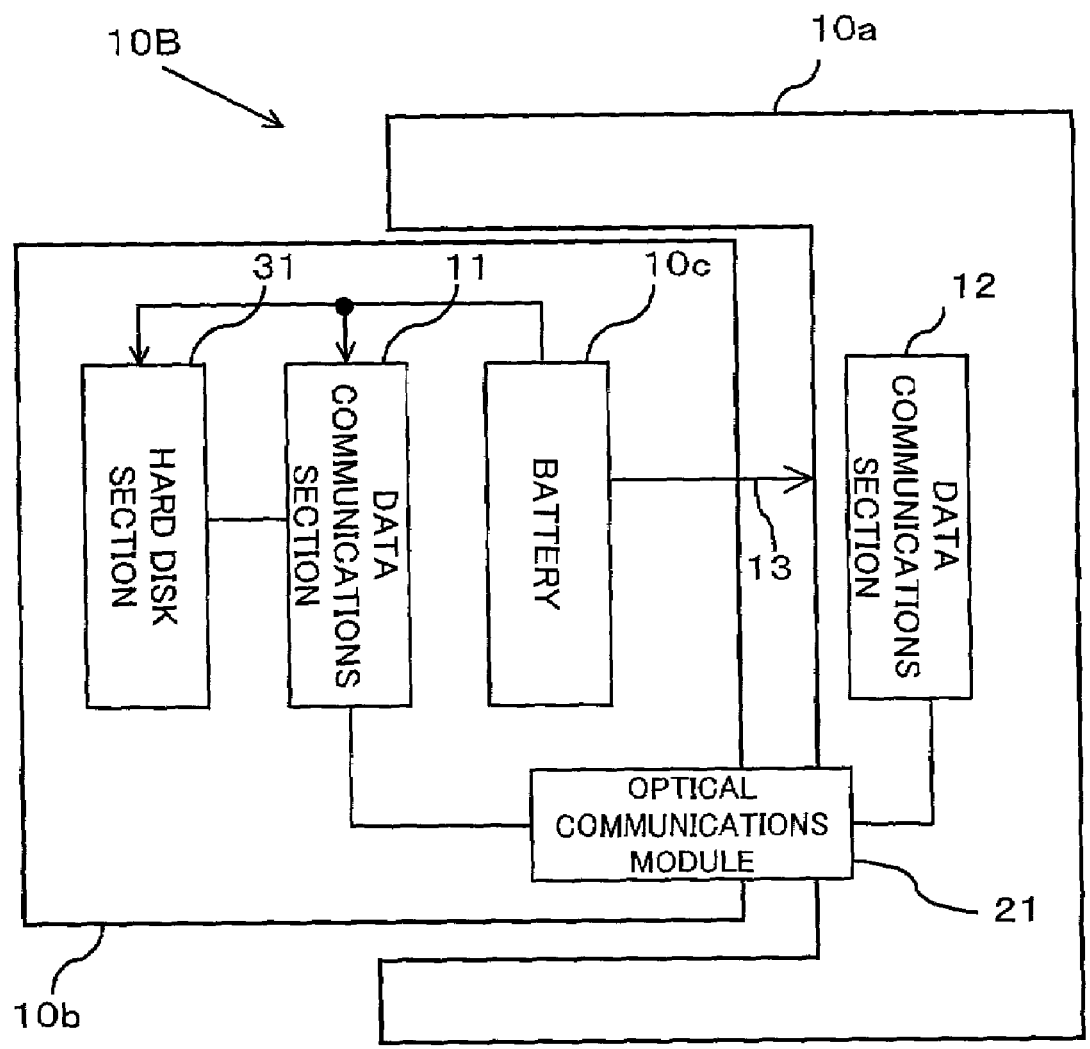
FIG. 2 is a block diagram schematically showing the mobile electronic apparatus of a second embodiment.

FIG. 2 shows a mobile electronic apparatus of a second embodiment. The mobile electronic apparatus 10B of the second embodiment, which is also carried by an authorized user to perform various processes to various types of electronic information, has a battery power supply casing (battery pack) 10*b*, which is detachably attached to a main body 10*a* of the apparatus 10B. To cite examples in the market, there are internet appliances such as cell phones, mobile electronic information terminals, and PDAs. Like reference numbers designate similar parts or elements throughout several views, so their detailed description is omitted here.

In the mobile electronic apparatus 10B of the second embodiment, however, a small-sized hard disk section 31 is built in the battery pack 10b as a integral part to serve as the extended I/O device section 30 of the first embodiment, and an optical communications module (optical communications section) 21 is equipped to serve as the interface section 20 of the first embodiment.

The optical communications module 21, which is formed in such a manner as described later with reference made to FIG. 8 in the fourth embodiment, is disposed where the battery pack 10b contacts with the main body 10a of the mobile electronic apparatus 10B and receives/sends I/O signals from/to the hard disk section 31 in the form of optical signals such as infrared rays. Via this optical communications module 21 (and the data communications sections 11, 12), desired data is written from the main body 10a side to the hard disk section 31 while the data stored in the hard disk section 31 is readout to the main body 10a.

With this construction, in the mobile electronic apparatus 10B, the hard disk section 31 is formed integrally with the battery pack 10b, which is detachably attached to the main body 10a, thereby making the hard disk section 31 also attached to the main body 10a.

At this state, data communication is performed between the hard disk section 31 and the main body 10a via the optical communications module 21.

Therefore, it is possible to add and expand the amount of the memory of an existing mobile electronic apparatus in a simple manner, namely, only by replacing an existing battery pack, which is detachably attached, with another battery pack 10b having the hard disk 31, without the risk of impairing the mobility of the mobile electronic apparatus 10B and without making any modification to hardware of the main body 10a of the mobile electronic apparatus 10B, thus improving the user friendliness in a great degree. And also, in the second embodiment, since the optical communications module 21 is employed as the interface, it would be made easy to use a camera or a display likely to be provided to the battery pack 10b as an integral part.

Additionally, since the battery 10c is shared as a common power source among the data communications section 11, the hard disk section 31, and the main body 10a, it is unnecessary to prepare another power supply dedicated for the hard disk section 31.

Still further, since only the battery 10c is detachable from the battery pack 10b, the user can continue to use the battery pack 10b having the hard disk section 31 by only replacing the battery 10c with another even when the battery 10c itself becomes wearing out.

(3) Third Embodiment

Figure 3:
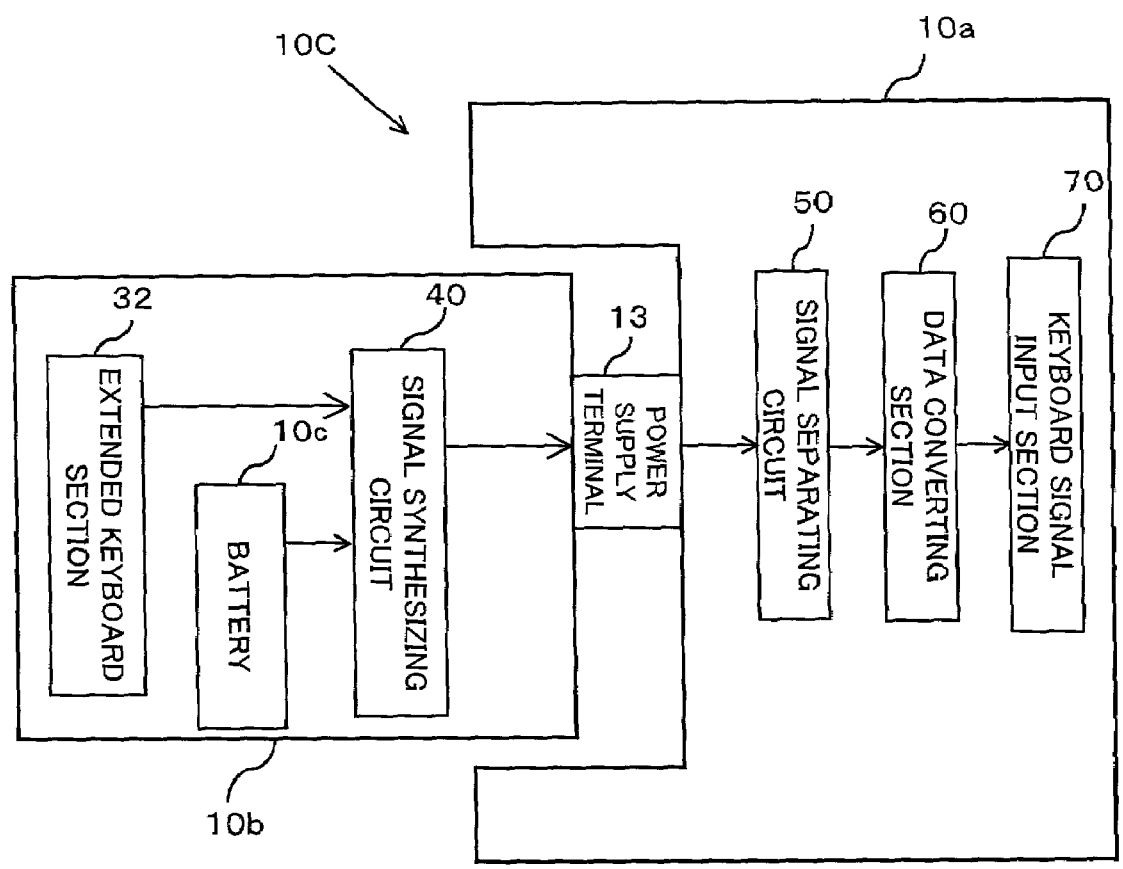
FIG. 3 is a block diagram schematically showing the mobile electronic apparatus of a third embodiment.
Figure 4:
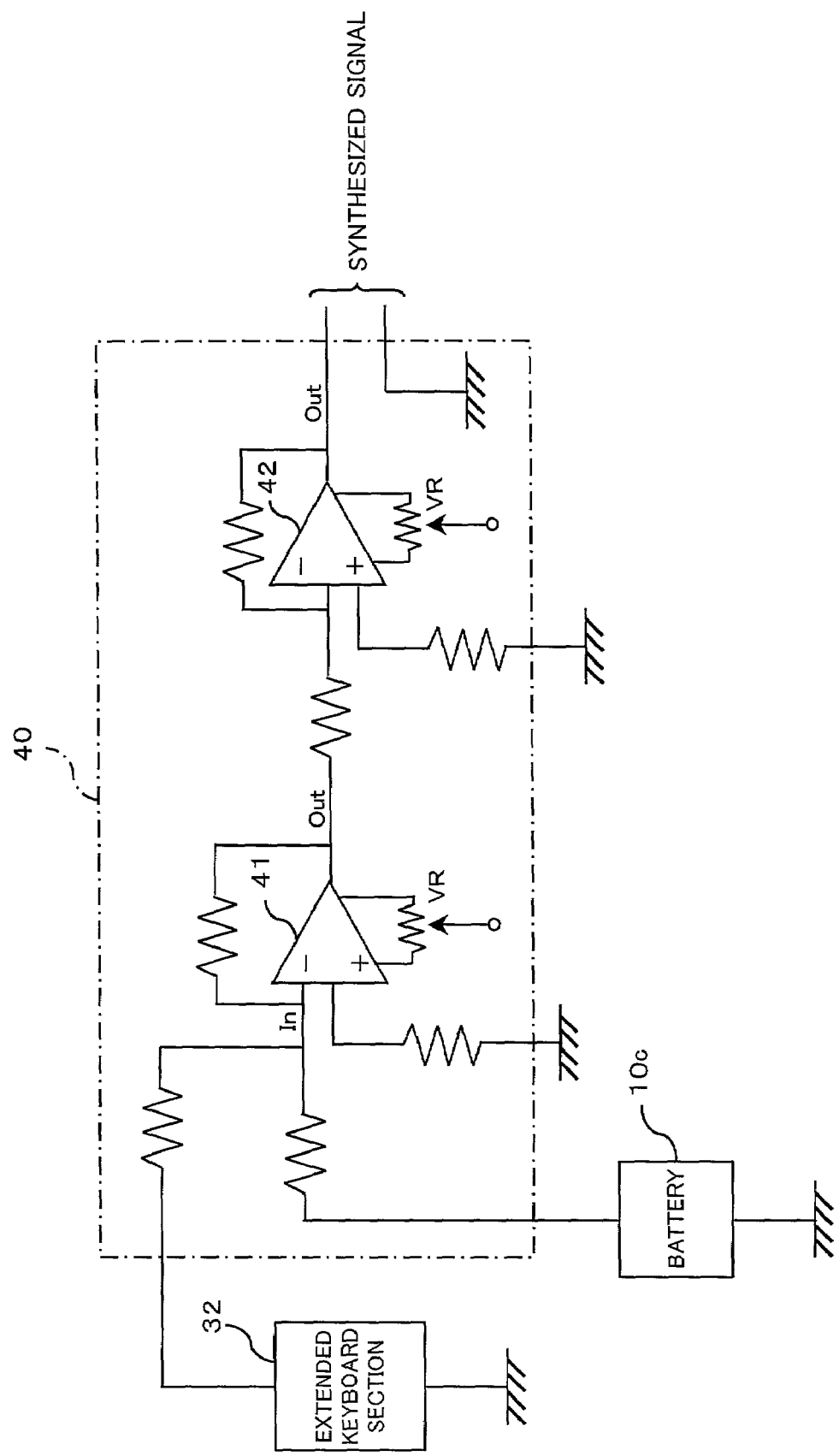
FIG. 4 is a circuit diagram showing a signal synthesizing circuit (adder circuit) according to the third embodiment.
Figure 5:
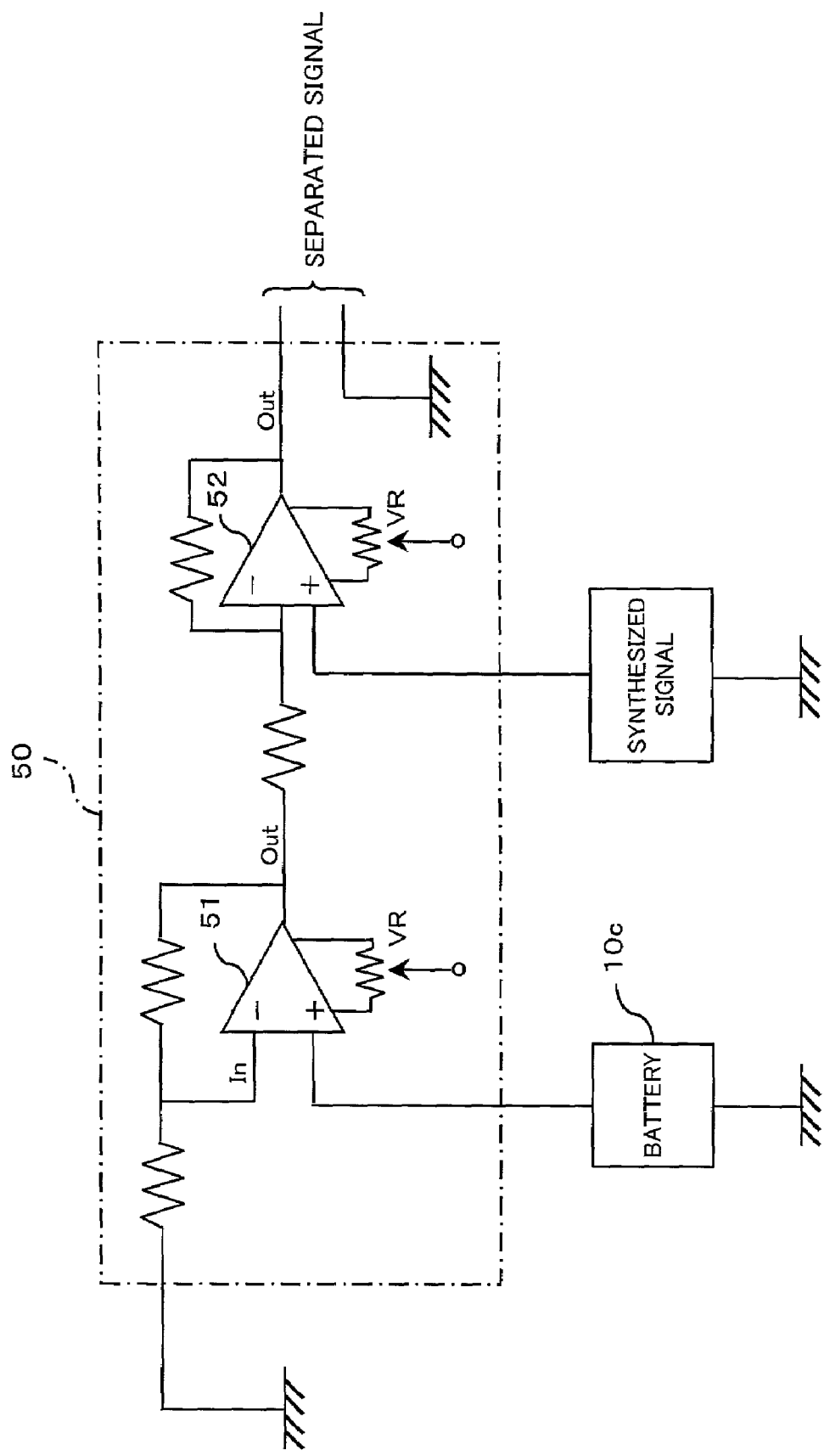
FIG. 5 is a circuit diagram showing a signal separating circuit (subtracter circuit) according to the third embodiment.

FIG. 3 shows a mobile electronic apparatus of a third embodiment; FIG. 4 shows the details of a signal synthesizing circuit (adder circuit) of this embodiment; and FIG. 5 shows the details of a signal separating circuit (subtracter circuit) of this embodiment. Like reference numbers designate similar parts or elements throughout several views, so their detailed description is omitted here.

The mobile electronic apparatus 10C of the third embodiment, which is also carried by an authorized user to perform various processes to various types of electronic information, has a battery power supply casing (battery pack) 10b, which is detachably attached to a main body 10a of the apparatus 10C. To cite examples in the market, there are cell phones and mobile electronic information terminals. The main body 10a of the mobile electronic apparatus 10C has keys such as push/press buttons (not shown), a signal (keyboard signal) input through which keys is input to the keyboard signal input section 70 in a predetermined form.

In the mobile electronic apparatus 10C of the third embodiment, however, an extended keyboard section (input section) 32 is mounted to the battery pack 10b as an integral part to serve as the extended I/O device section 30 of the first embodiment, and a signal synthesizing circuit 40, a signal separating circuit 50, a data converting section 60, and a keyboard signal input section 70 are equipped in place of the data communications sections 11, 12 and the interface section 20 of the first embodiment.

A key-input signal input from the extended keyboard section 32 is sent to the main body 10a via a power supply terminal (DC terminal) 13, which is electrically connected between the battery pack 10b and the main body 10a for supplying electric power from the battery 10c to the main body 10a.

For this purpose, the signal synthesizing circuit 40 is equipped to the battery pack 10b while the signal separating circuit 50, the data converting section 60, and the keyboard signal input section 70 are equipped to the main body 10a.

The signal synthesizing circuit 40 carries the key-input signal (output data signal, signal pulse), which is input from the extended keyboard section 32, onto a power supply voltage (output voltage), which is fed from the battery 10c to the main body 10a, in the form of a frequency modulation (FM) signal or an amplitude modulation (AM) signal. FIG. 4 shows an exemplary signal synthesizing circuit 40, which is formed as an adder circuit (for adding the key-input signal and the power supply voltage) constituted by two operational amplifiers 41, 42 having a variable resister circuit (VR). After being synthesized with the key-input signal by the signal synthesizing circuit 40, the power supply voltage is fed to the main body 10a via the power supply terminal 13 as normal, thereby sending the key-input signal from the battery pack 10b to the main body 10a.

The signal separating circuit 50 separates the key-input signal from the thus obtained synthesized signal (power supply voltage) received from the battery pack 10b. That is, the signal separating circuit 50 separates a key-input signal component and a power supply component. FIG. 5 shows an exemplary signal separating circuit 50, which is formed as an subtracter circuit (for subtracting a normal power supply voltage, which is separately sent, from the synthesized signal obtained by synthesizing the key-input signal and the power supply voltage) constituted by two operational amplifiers 51, 52 having a variable resister circuit (VR).

The data converting section 60 converts the form of the key-input signal, which is separated by the signal separating circuit 50, into the same form as that of a key-input signal input to the main body 10a (keyboard signal of the main body 10a side) and inputs the resultant signal to the keyboard signal input section 70.

With this construction, in the mobile electronic apparatus 10C, the extended keyboard section 32 is formed integrally with the battery pack 10b, which is detachably attached to the main body 10a, thereby making the extended keyboard section 32 also attached to the main body 10a.

At this state, the key-input signal, which is input from the extended keyboard section 32, is carried onto the output voltage, which is fed from the battery 10c, in the form of a frequency modulation (FM) signal or an amplitude modulation (AM) signal to produce the synthesized signal. The synthesized signal is then sent to the main body 10a via the power supply terminal 13. On the main body 10a, the signal separating circuit 50 separates the synthesized signal received from the battery pack 10b into a power supply component and an input data signal component.

After that, the separated input data signal component, or the output signal from the extended keyboard section 32, is converted into a key-input-pattern signal (keyboard signal) of a predetermined form before input to the keyboard signal input section 70.

In this manner, since it is possible to keep the compatibility between the output signal (key-input signal) from the extended keyboard section 32 and the input data signal input through the keys (push/press buttons) of the main body 10a, the output of the extended keyboard section 32 can be input to the keyboard signal input section 70 without being discriminated from the above-mentioned keyboard signal input through the keys.

Therefore, it is possible to greatly expand the key-input function originally equipped to the main body 10a in a simple manner, namely, only by replacing the existing battery pack, which is detachably attached to the main body 10a of the mobile electronic apparatus 10C, with another battery pack 10b to which the extended keyboard section 32 is equipped, without the risk of impairing the mobility of the mobile electronic apparatus 10C and without making any modification to hardware of the main body 10a of the mobile electronic apparatus 10C, thus providing significantly improved user friendliness.

Further, since the input signal from the extended keyboard section 32 is carried onto a power supply voltage by the signal synthesizing circuit 40, and is then, on the main body 10a side, separated and picked up from the voltage by the signal separating circuit 50, the power supply terminal 13 for the battery pack 10b can serve both as a power supply and as an interface at the same time, thus making it possible to send the key-input signal from the extended keyboard section 32 to the main body 10a without making any arrangement in the construction. Accordingly, it is resultantly possible to send the input signal from the extended keyboard section 32 to the main body 10a, without the need for an interface newly equipped in hardware, or without making any change in the design of the existing mobile electronic apparatus.

Furthermore, also in the third embodiment, since only the battery 10c is detachable from the battery pack 10b, the user can continue to use the battery pack having the extended keyboard section 32 by only replacing the battery 10c with another even when the battery itself becomes wearing out.

In the above description of the third embodiment, the input section mounted to the battery pack 10b was exemplified by the extended keyboard section 32. Alternatively, the input section may be a camera, a table, or a user verifying device. In that case also, the signal is sent to the main body 10a via the power supply terminal 13, and like results and effects to those of the third embodiment can be achieved. A description will be made later in the fourth embodiment with reference to FIGS. 11 and 18, of an example in which the input section is the user verifying device and in which the signal output from the user verifying device is sent to the main body 10a via the power supply terminal 13.

(4) Fourth Embodiment

Figure 6:
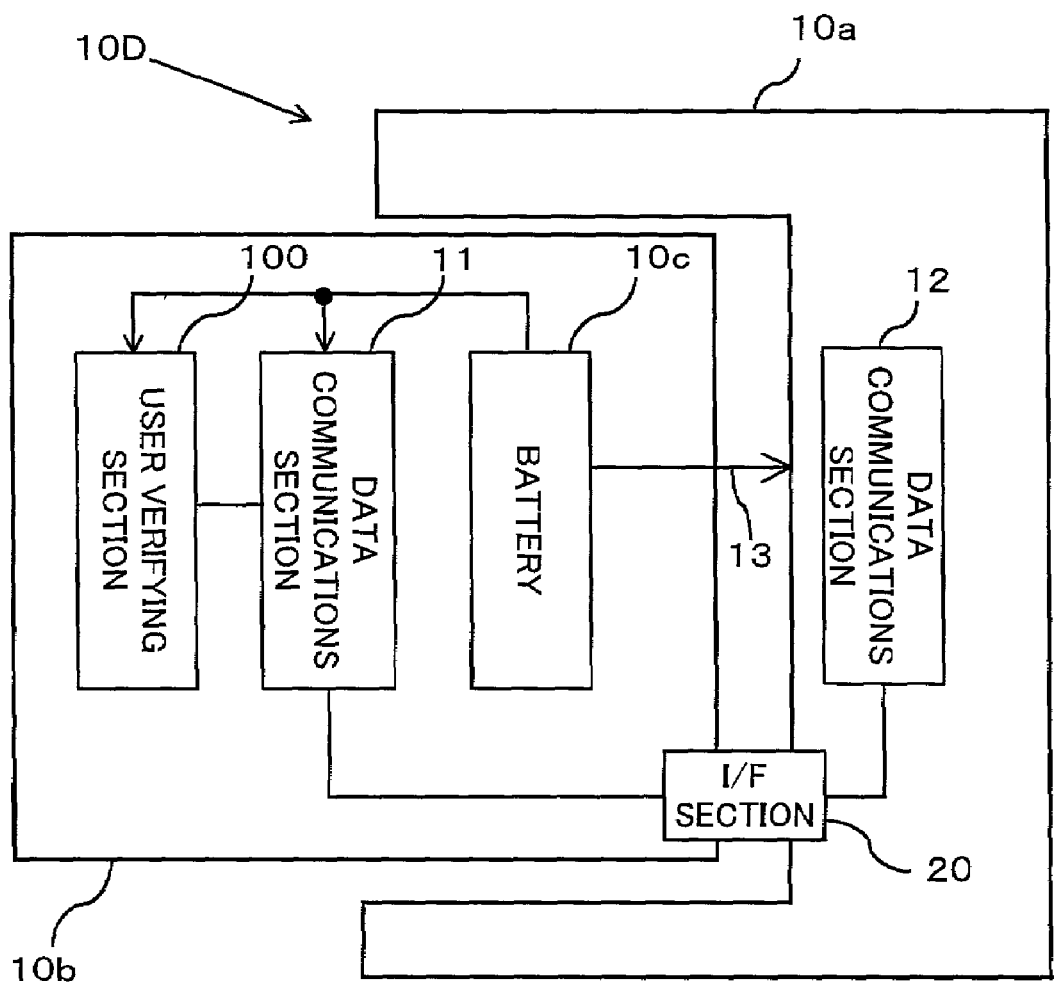
FIG. 6 is a block diagram schematically showing the mobile electronic apparatus of a fourth embodiment.

FIG. 6 shows a mobile electronic apparatus of a fourth embodiment. The mobile electronic apparatus 10D of the fourth embodiment, which is also carried by an authorized user to perform various processes to various types of electronic information, has a battery power supply casing (battery pack) 10b, which is detachably attached to a main body 10a of the apparatus 10D. To cite examples in the market, there are cell phones and mobile electronic information terminals. Like reference numbers designate similar parts or elements throughout several views, so their detailed description is omitted here.

In the mobile electronic apparatus 10D of the fourth embodiment, however, a user verifying section 100 is built in the battery pack 10b as a integral part to serve as the extended I/O device section 30 of the first embodiment. The user verifying section 100 verifies an object person by using biometric information (fingerprint, palmprint, finger shape, hand shape, voiceprint, retina, iris, facial recognition, signature dynamics, blood vessel pattern, key strokes, etc.) and outputs corresponding information in response to the verifying result. The data output from the user verifying section 100 is then sent from the battery pack 10b side to the main body 10a via the interface section 20 (and the data communications sections 11, 12).

Precisely, the user verifying section 100 is constructed in such a manner as described later with reference made to FIGS. 13 through 18 (reference numbers 100A, 100B, 100B-1, 100B-2, 100C).

An exemplary interface section 20 of the fourth embodiment will be described later with reference made to FIGS. 7 through 11.

Further, when a fingerprint is used as the biometric information to verify a user, the following data is sent from the user verifying section 100 to the main body 10a:

a) fingerprint feature information for verification extracted from the fingerprint information (described later with reference to FIG. 13);

b) fingerprint verification result data (described later with reference to FIGS. 14 through 16);

c) personal data (personal identification code (PIC) and account, etc.) readout in response to the fingerprint verification result (described later with reference to FIG. 17).

With this construction, in the mobile electronic apparatus 10D, the user verifying section 100 is formed integrally with the battery pack 10b, which is detachably attached to the main body 10a, thereby making the user verifying section 100 also attached to the main body 10a.

At this state, the verification result data output from the user verifying section 100 is sent from the battery pack 10b to the main body 10a via the interface section 20.

Therefore, it is possible to associate the user verification function utilizing biometric information (fingerprint) with the mobile electronic apparatus 10D in a simple manner, namely, only by replacing the existing battery pack, which is detachably attached to the main body 10a of the existing mobile electronic apparatus 10D, with another battery pack 10b to which the user verifying section 100 is equipped, without the risk of impairing the mobility of the mobile electronic apparatus 10D and without making any modification to hardware of the main body 10a of the mobile electronic apparatus 10D. Thereby, it is possible to most easily add to the mobile electronic apparatus 10D the user verification function that effectively realizes various types of verification processes, which have nowadays been introduced in conventional mobile electronic apparatus, thus improving the user friendliness.

Further, also in the fourth embodiment, since the battery 10c is shared as a common power source among the data communications section 11, the user verifying section 100, and the main body 10a, it is unnecessary to prepare another power supply dedicated for the user verifying section 100.

Still further, since only the battery 10c is detachable from the battery pack 10b, the user can continue to use the battery pack 10b having the user verifying section 100 by only replacing the battery 10c with another even when the battery itself becomes wearing out.

(4-1) Interface Section

Figure 7:
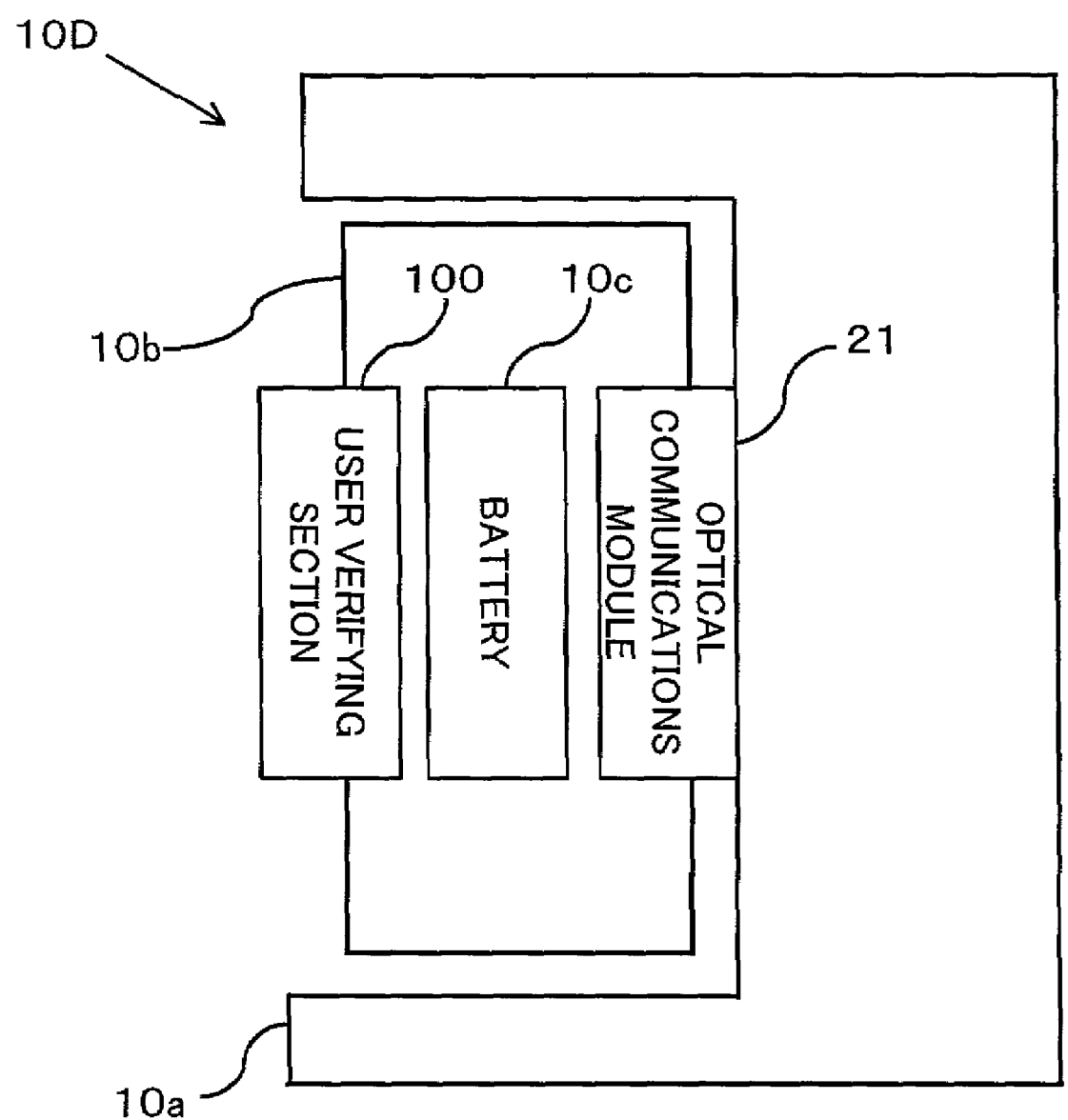
FIGS. 7 and 8 are diagrams respectively illustrating an interface section according to the fourth embodiment.
Figure 8:
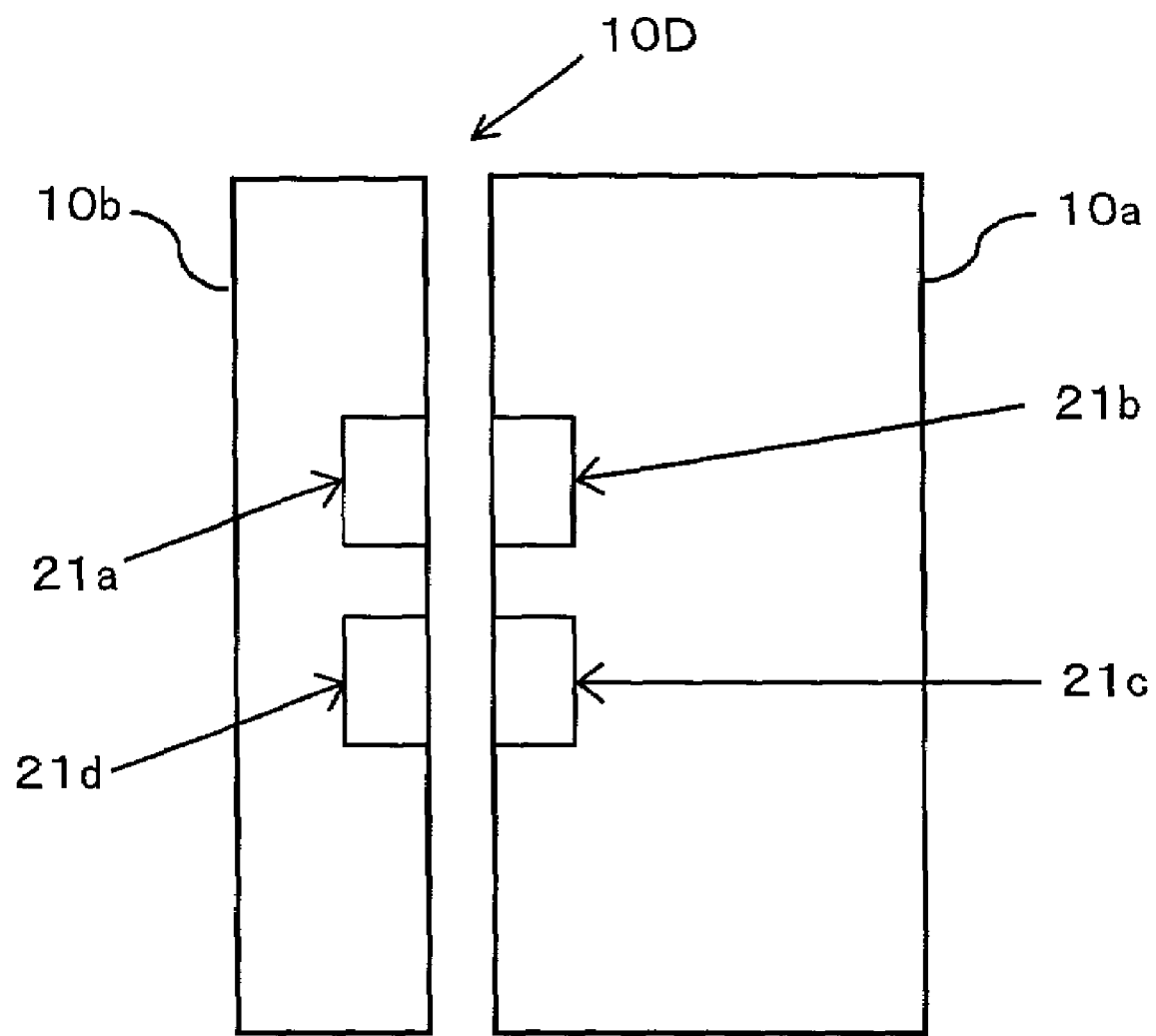

FIGS. 7 and 8 show respectively an interface section of the fourth embodiment. In these examples, the optical communications module (optical communications section) 21 the same as that of the second embodiment is provided as the interface section.

The optical communications module 21, which is disposed where the battery pack 10b and the main body 10a contact, transfers optical signals (IrDA), such as infrared rays, between the battery pack 10b and the main body 10a. Data output from the user verifying section 100 is sent from the battery pack 10b to the main body 10a via the optical communications module 21 (and the data communications sections 11, 12) in the fourth embodiment.

In the optical communications module 21, as shown in FIG. 8, a light emitting module (LED for optical communications) 21a and alight receiving module (photo acceptance element) 21b are provided in pairs to the battery pack 10b and the main body 10a, respectively, in order to send the data from the battery pack 10b to the main body 10a in the form of optical signals. Whereas a light emitting module (LED for optical communications) 21c and a light receiving module (photo acceptance element) 21d are provided in pairs to the main body 10a and the battery pack 10b, respectively, in order to send the data from the main body 10a to the battery pack 10b in the form of optical signals.

Such a type of optical communications module 21 used as the interface section would eliminate the protrusion of a terminal, such as an connector, from the main body 10a or the battery pack 10b toward the outside.

As it suffices that the data from the user verifying section 100 is sent from the battery pack 10b to the main body 10a, the optical communications module 21 needs to have at least the light emitting module 21a and the light receiving module 21b.

(4-2) First Modification of Fourth Embodiment

Figure 9:
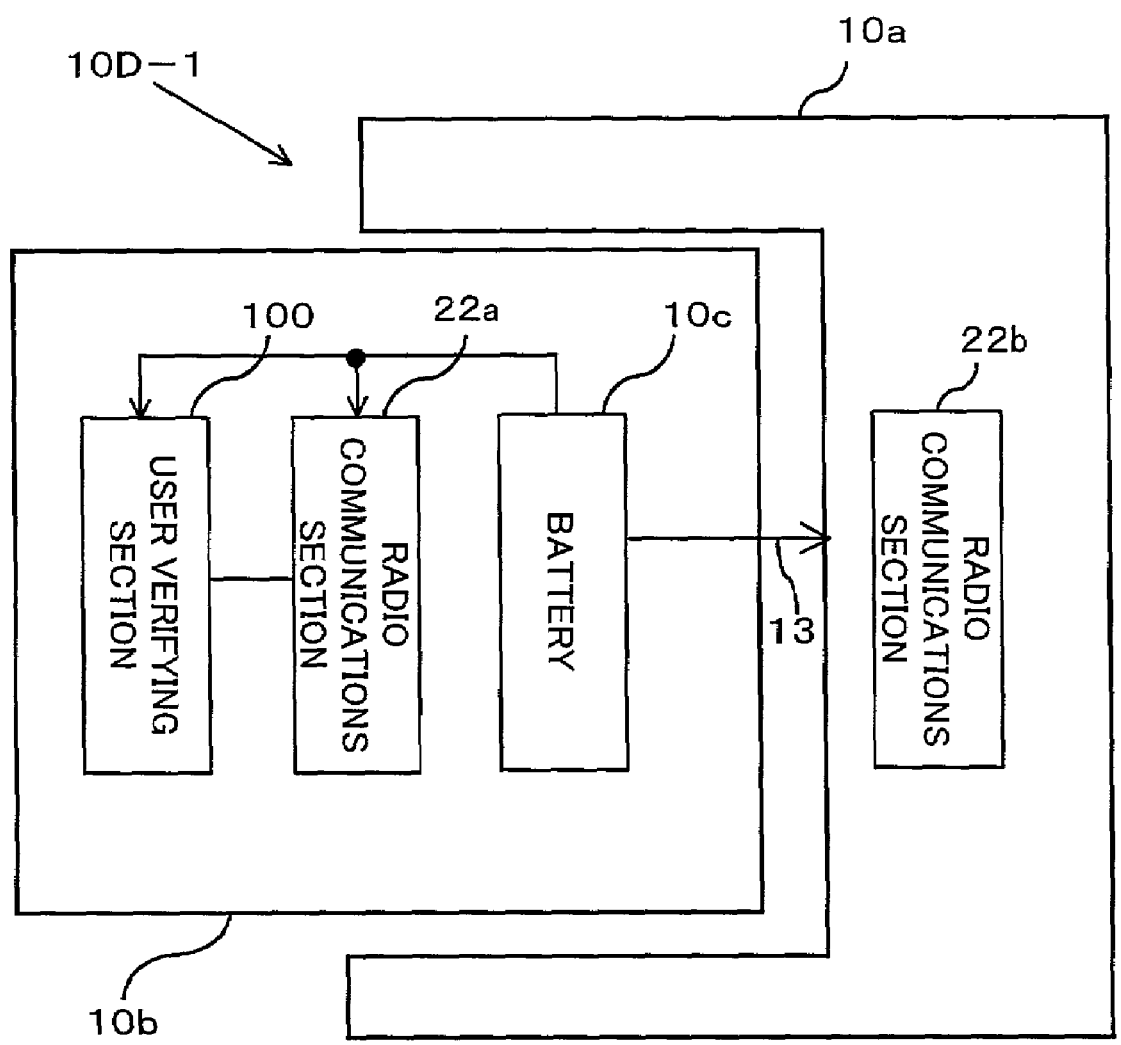
FIG. 9 is a block diagram schematically showing the mobile electronic apparatus of a first modification (a first modification of the interface section) of the fourth embodiment.

FIG. 9 shows a first modification of the mobile electronic apparatus (first modification of the interface section) of the fourth embodiment. The mobile electronic apparatus 10D-1 of FIG. 9 has radio communications sections 22a, 22b to serve as the interface section. The radio communications sections 22a, 22b are provided to the battery pack 10b and the main body 10a, respectively, to transfer the data (data output from the user verifying section 100 in the present embodiment) in the form of radio signals between the battery pack 10b and the main body 10a. Like reference numbers designate similar parts or elements throughout several views, so their detailed description is omitted here.

Since the radio communications sections 22a, 22b serves as the interface section, thereby eliminating the need for any special construction for realizing the interface section, it is unnecessary to make any modification to the shape of the casing of the main body 10a and the battery pack 10b.

(4-3) Second Modification of Fourth Embodiment

Figure 10:
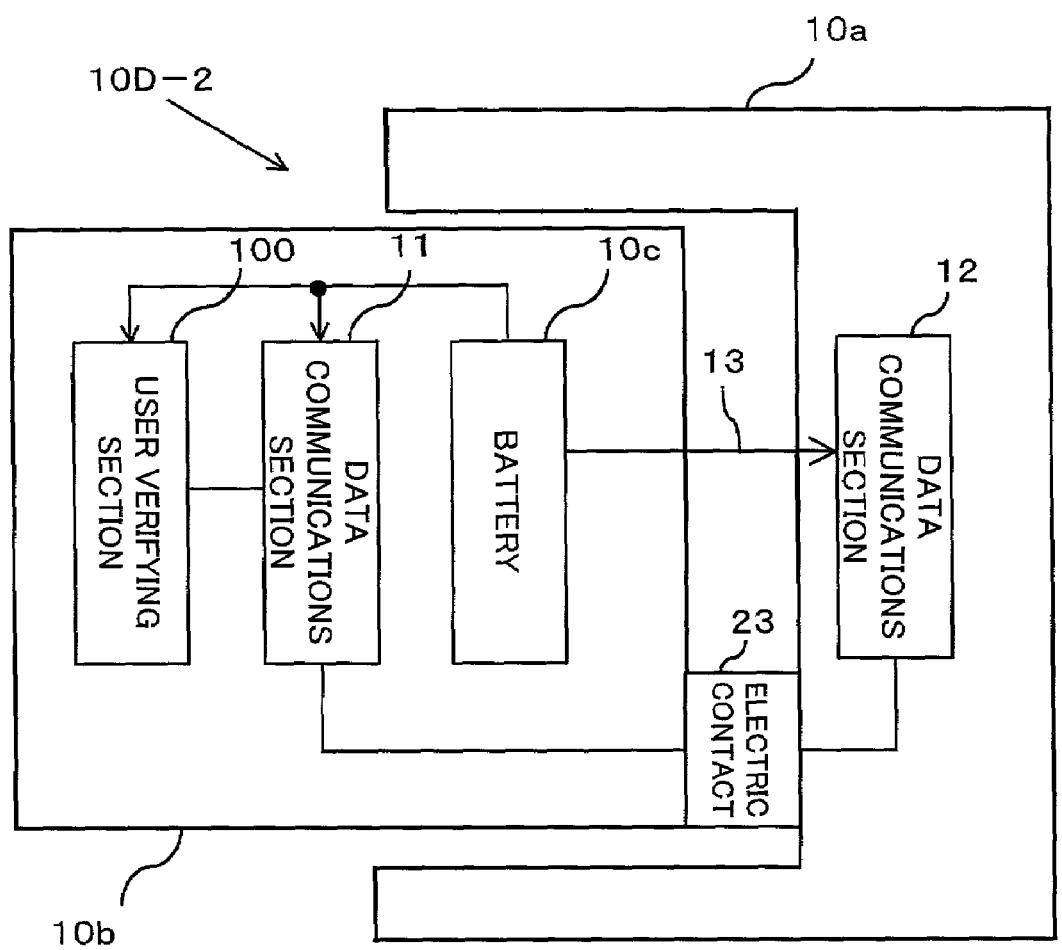
FIG. 10 is a block diagram schematically showing the mobile electronic apparatus of a second modification (a second modification of the interface section) of the fourth embodiment.

FIG. 10 shows a second modification of the mobile electronic apparatus (second modification of the interface section) of the fourth embodiment. The mobile electronic apparatus 10D-2 of FIG. 10 has an electric contact (connector) 23 to serve as the interface section. The electric contact 23 is connected between the battery pack 10b and the main body 10a to transfer the data (data from the user verifying section 100 in the present embodiment) therebetween. Like reference numbers designate similar parts or elements throughout several views, so their detailed description is omitted here.

(4-4) Third Modification of Fourth Embodiment

Figure 11:
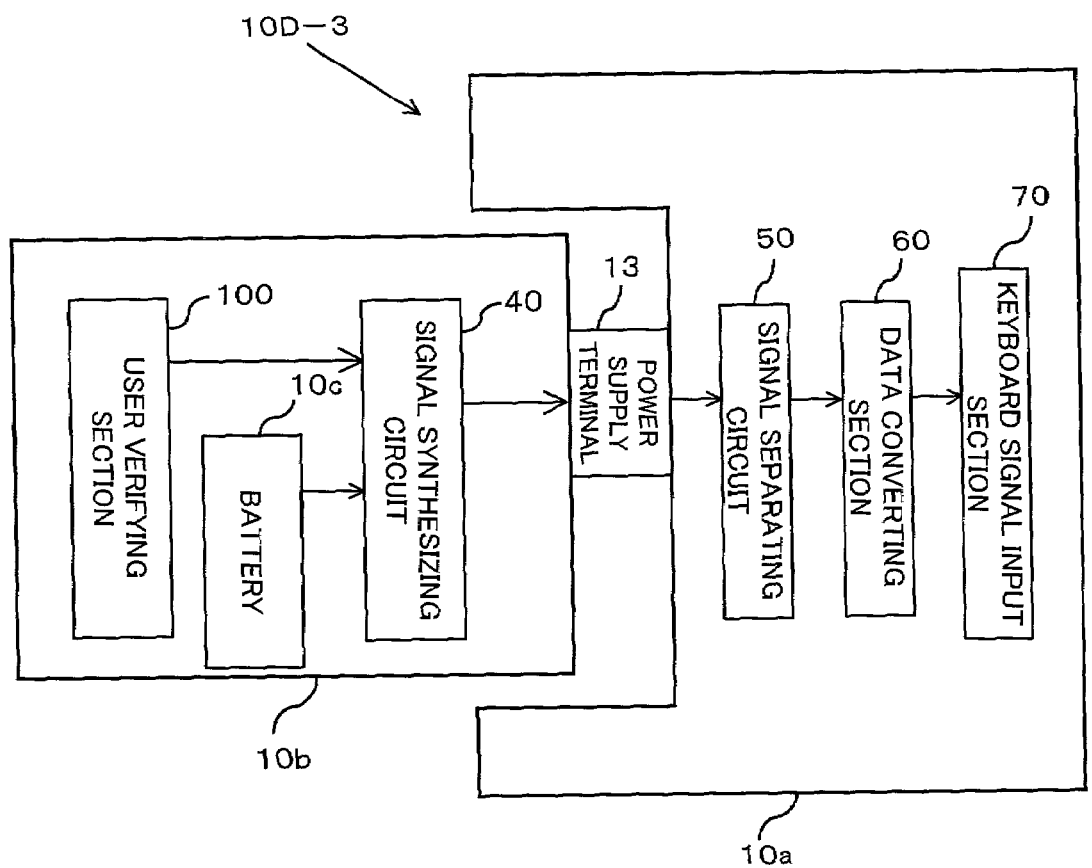
FIG. 11 is a block diagram schematically showing the mobile electronic apparatus of a third modification (a third modification of the interface section) of the fourth embodiment.

FIG. 11 shows a third modification of the mobile electronic apparatus (third modification of the interface section) of the fourth embodiment. The mobile electronic apparatus 10D-3 of FIG. 11, like the mobile electronic apparatus 10C of the third embodiment, has the signal synthesizing circuit 40, the signal separating circuit 50, the data converting section 60, and the keyboard signal input section 70 in place of the data communications sections 11, 12 and the interface section 20 of FIG. 6. In other words, the mobile electronic apparatus 10D-3 of FIG. 11 is equipped with the user verifying section 100 in place of the extended keyboard section 32 of the mobile electronic apparatus 10C of FIGS. 3 through 5. Like reference numbers designate similar parts or elements throughout several views, so their detailed description is omitted here.

With this construction of the mobile electronic apparatus 10D-3, the data output from the user verifying section 100 is sent from the battery pack 10b to the main body 10a via the power supply terminal 13, which is electrically connected between the battery pack 10b and the main body 10a for supplying electric power from the battery 10c to the main body 10a.

Precisely, the data output from the user verifying section 100 is carried onto an output voltage of the battery 10c by the signal synthesizing circuit 40 in the form of an FM modulation signal or an AM modulation signal to make a synthesized signal, which is sent to the main body 10a via the power supply terminal 13. On the main body 10a side, the synthesized signal received from the battery pack 10b is separated into a power supply component and a data signal component by the signal separating circuit 50.

The data signal thus separated from the synthesized signal is converted by the data converting section 60 into a key-input-pattern signal (keyboard signal) of a predetermined form and then input to the keyboard signal input section 70.

Hereby, since it is possible to keep the compatibility between the data output from the user verifying section 100 and the input data signal, such as passwords, input through the keys (push/press buttons) of the main body 10a, the data output from the user verifying section 100 can be input to the keyboard signal input section 70 without discriminated from the above-mentioned keyboard signal input through the keys.

(4-5) Other Modification of Interface

A cable (not shown) connecting the user verifying section 100 (data communications section 11) and the connector terminal (not shown) of the main body 10a may be used as another interface section.

(4-6) Fourth Modification of Fourth Embodiment

Figure 12:
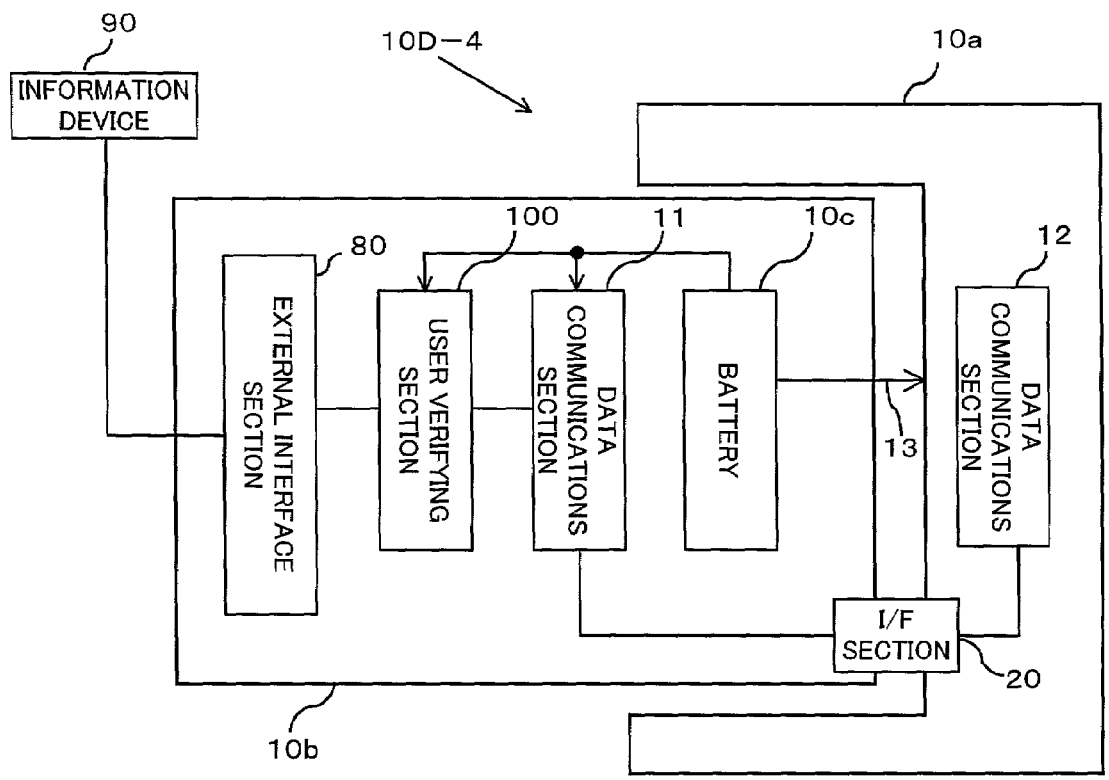
FIG. 12 is a block diagram schematically showing the mobile electronic apparatus of a fourth modification of the fourth embodiment.

FIG. 12 shows a fourth modification of the mobile electronic apparatus of the fourth embodiment. The mobile electronic apparatus 10D-4 of FIG. 12 is constructed the same as the mobile electronic apparatus 10D of FIG. 6 and additionally has an external interface section 80 built in the battery pack 10b as an integral part. Like reference numbers designate similar parts or elements throughout several views, so their detailed description is omitted here.

The external interface section 80 is connected with an information device 90, such as a mobile electronic information terminal and a personal computer, other than the main body 10a, to transfer data between the information device 90 and the user verifying section (input/output section, input section) 100. The data transferred therebetween is, for example, data output from the user verifying section 100 (fingerprint feature information for verification, verification result, and personal data) and the setting information of the user verifying section 100 (extended I/O device section 30, etc.).

With this construction, it is possible to access from the information device 90 to the user verifying section 100 (extended I/O device section 30, etc.) via the external interface section 80 to make a change in the setting state of the user verifying section 100. Moreover, it is also possible to directly output to the information device 90, the data (signal from the extended I/O device section 30) output from the user verifying section 100, via the external interface section 80, thus further improving the user friendliness.

In this instance, the external interface section 80 may be equipped to the above-mentioned mobile electronic apparatus 10A through 10D, 10D-1 through 10D-3, and also to the mobile electronic apparatus 10D-5 described later.

(4-7) First Example of User Verifying Section

Examples of such user verifying sections of the fourth embodiment will now be described with reference to FIGS. 13 through 17.

Figure 13:
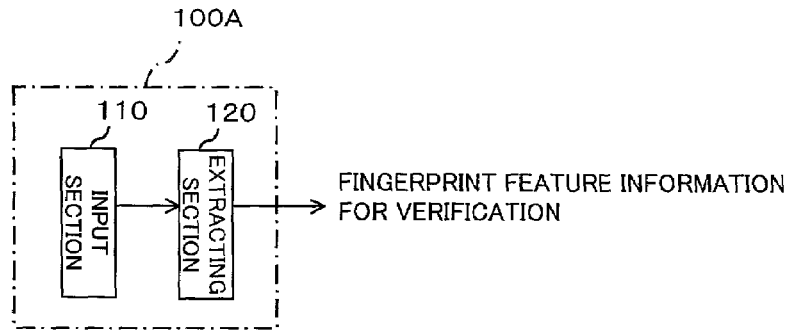
FIG. 13 is a block diagram schematically showing a first example of a user verifying section of the fourth embodiment.

FIG. 13 shows a first example of the user verifying section of the fourth embodiment. The user verifying section 100A of FIG. 13 comprises an input section 110 and an extracting section 120, for verifying a user by using biometric information (fingerprint, palmprint, finger shape, hand shape, voiceprint, retina, iris, facial recognition, signature dynamics, blood vessel pattern, key strokes, etc.). In the following description, a fingerprint is employed as exemplary biometric information.

The input section 110 measures and inputs fingerprint information (image data of a fingerprint) of an object person to be verified.

From the fingerprint information thus measured and input, the extracting section 120 extracts fingerprint feature information for verifying the object person. Here, the fingerprint feature information extracted from the fingerprint information (image data of the fingerprint) is the coordinates of such points as ridge dividing points (minutiae), ridge end points (minutiae), ridge crossing points, the fingerprint core, and deltas, and ridge directions, distances between minutiae, the number of ridges between minutiae, and so on.

The user verifying section 100A is equipped to the battery pack 10b, and the fingerprint feature information of the object person extracted by the extracting section 120 is sent from the battery pack 10b side to the main body 10a via the interface section 20 or the signal synthesizing circuit 40 so that the fingerprint feature information of the object person can be verified on the main body 10a side.

(4-8) Second Example of User Verifying Section

Figure 14:
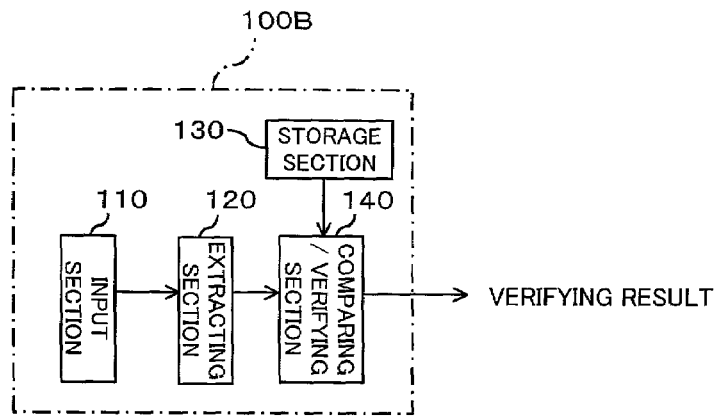
FIG. 14 is a block diagram schematically showing a second example of the user verifying section of the fourth embodiment.

FIG. 14 shows a second example to the user verifying section of the fourth embodiment. The user verifying section 100B of FIG. 14 further comprises a storage section 130 and a comparing/verifying section 140 in addition to the above-mentioned input section 110 and extracting section 120.

The storage section 130 stores previously obtained reference fingerprint feature information of the authorized user of the mobile electronic apparatus.

The comparing/verifying section 140 compares/verifies the fingerprint feature information of the object person, which is extracted by the extracting section 120, with the reference fingerprint feature information stored in the storage section 130 to discriminate whether or not the fingerprint feature information to be verified satisfies a predetermined matching condition with respect to the reference fingerprint feature information. If the result of the discrimination is positive, the fingerprint feature information of the object person, which has been extracted by the extracting section 120, is judged matching the authorized user's. In this instance, the predetermined matching condition is such that the rate (degree) of matching between the biometric feature information to be verified and the reference biometric feature information is larger than a predetermined value.

The user verifying section 100B is equipped to the battery pack 10b, and the result of the verification performed by the comparing/verifying section 140 is sent from the battery pack 10b side to the main body 10a via the interface section 20 or the signal synthesizing section 40 so that, in reply to the result of the fingerprint verification, corresponding processes can be performed on the main body 10a side.

(4-8-1) First Modification to Second Example of User Verifying Section

Figure 15:
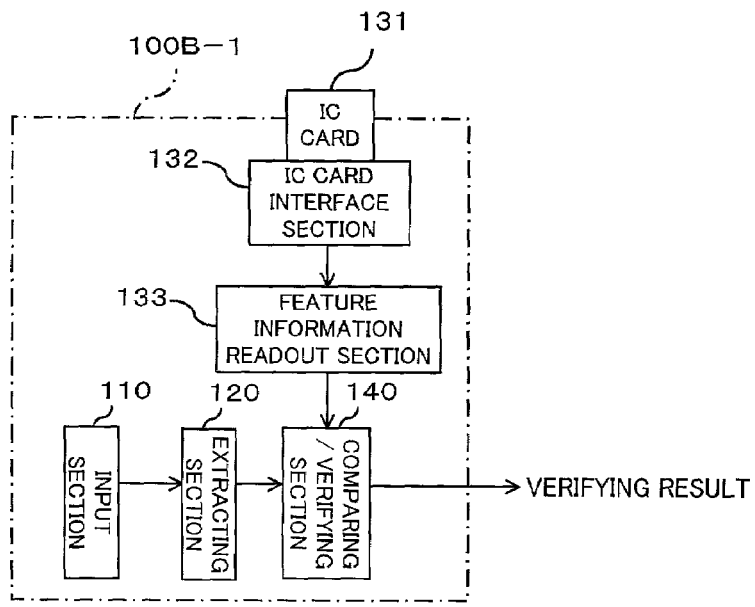
FIG. 15 is a block diagram schematically showing a first modified form of the second example of the user verifying section of the fourth embodiment.

FIG. 15 shows a first modification to the second example of the user verifying section of the fourth embodiment. In the user verifying section 100B-1 of FIG. 15, previously obtained reference fingerprint feature information is stored or registered in a portable memory medium, or an IC card 131. For this purpose, an IC card interface section 132 and a feature information read-out section 133 are provided in place of the storage section 130.

The IC card interface section (medium interface section) 132 is connected with the IC card (portable memory medium) 131 in which the previously obtained reference fingerprint feature information has been registered or stored. The feature information read-out section 133 reads out from the IC card 131 the reference fingerprint feature information via the IC card interface section 132 to send the readout information to the comparing/verifying section 140.

With this construction, the user verifying section 100B-1 verifies whether or not the object person is the authorized user whose fingerprint feature information is registered in the IC card 131 as the reference fingerprint feature information.

At that time, as a portable memory medium, various types of memory media rather than the IC card may be used, being exemplified by a memory card, such as an optical card and a BioCard (commercially available with trade name), a Smart Media (trade name of Toshiba Corporation), and a Memory Stick (trade name of SONY Corporation).

(4-8-2) Second Modification to Second Example of User Verifying Section

Figure 16:
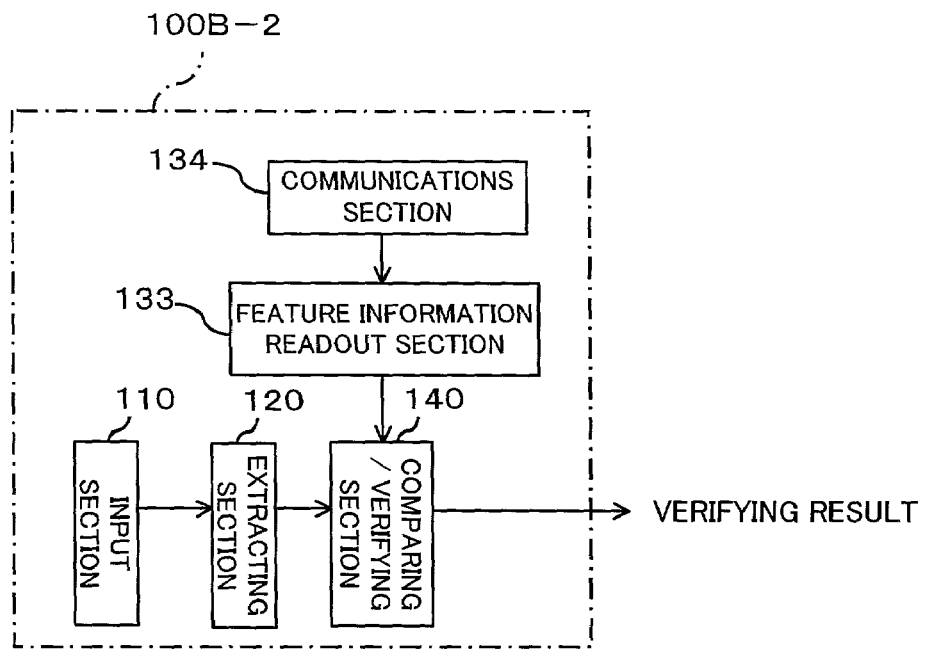
FIG. 16 is a block diagram schematically showing a second modified form of the second example of the user verifying section of the fourth embodiment.

FIG. 16 shows a second modification to the second example of the user verifying section of the fourth embodiment. In the user verifying section 100B-2 of FIG. 16, the reference fingerprint feature information is received from the external apparatus by wireless. For this purpose, a feature information read-out section 133 and a communications section 134 are provided in place of the storage section 130.

The communications section 134 receives the reference fingerprint feature information from the external apparatus by wireless, which information is then readout by the feature information read-out section 133 for being output to the comparing/verifying section 140.

With this construction, the user verifying section 100B-2 verifies whether or not the object person is the authorized user whose fingerprint feature information is received via the communications section 134 from the external apparatus as the reference fingerprint feature information.

(4-9) Third Example of User Verifying Section

Figure 17:
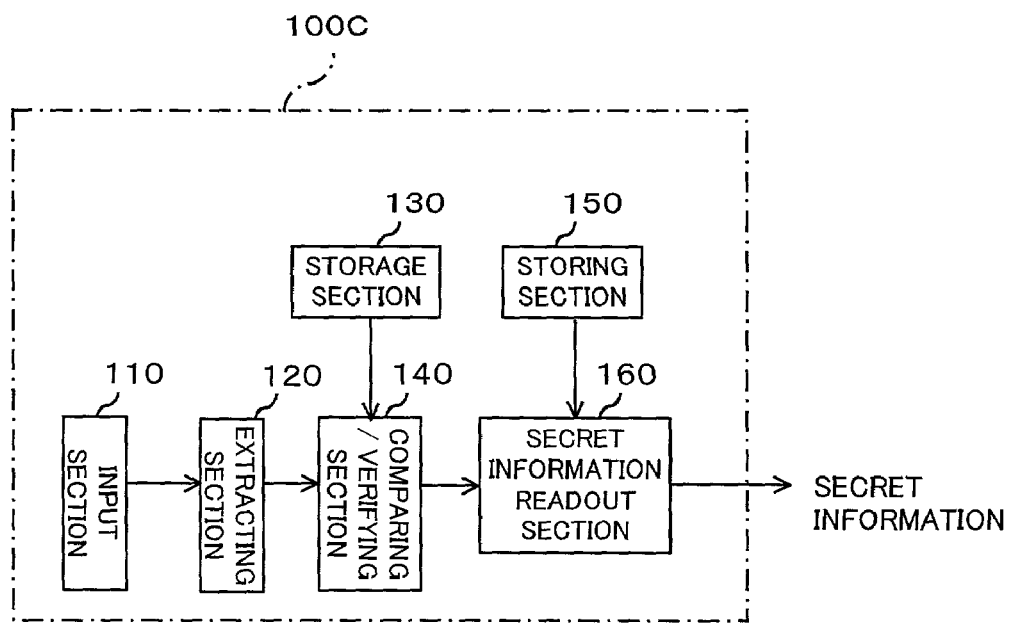
FIG. 17 is a block diagram schematically showing a third example of the user verifying section of the fourth embodiment.

FIG. 17 shows a third example of the user verifying section of the fourth embodiment. In the user verifying section 100C of FIG. 17 further comprises a storing section 150 and a personal data read-out section 160 in addition to the input section 110, the extracting section 120, the storage section 130, and the comparing/verifying section 140.

The storing section 150 stores previously obtained personal data of the authorized user of the mobile electronic apparatus such as, a PIC including a password, PIN, or a secret key; account information corresponding to the PIC, including an account name, an ID, a computer name, or an IP address (more specifically, a bank account number); and a system name corresponding to the account information (more specifically, a bank name, application name, computer name, etc.); the health insurance certificate number; and medical information.

As the result of comparison of the fingerprint feature information of the object person and the reference fingerprint feature information, if the comparing/verifying section 140 recognizes the fingerprint feature information of the object person matching the reference fingerprint feature information, the personal data read-out section 160 readouts the personal data stored in the storing section 150.

The user verifying section 100C is equipped to the battery pack 10b, and the personal data, which is readout by the personal data read-out section 160, is sent from the battery pack 10b side to the main body 10a via the interface section 20 or the signal synthesizing circuit 40 so that the mobile electronic apparatus 10D, 10D-1 through 10D-5 are added with the function of managing the authorized user's personal data stored in the storing section 150 by fingerprint verification.

Therefore it is possible to protect and guard the personal data by verifying a user with fingerprint information (biometric information), which is free from being stolen or faked by an unauthorized user. For example, the user must be verified using a fingerprint before the personal data is sent to the main body 10a side, thus enabling an access to the personal data, thereby guaranteeing a highest degree of security.

As shown in FIGS. 15 and 16, also in the user verifying section 100C, the storage section 130 may be substituted by the IC card interface section 132 and the feature information read-out section 133, or by the feature information read-out section 133 and the communications section 134, so that the reference biometric feature information (reference fingerprint feature information) is received from an external apparatus.

(4-10) Fifth Modification of Fourth Embodiment

Figure 18:
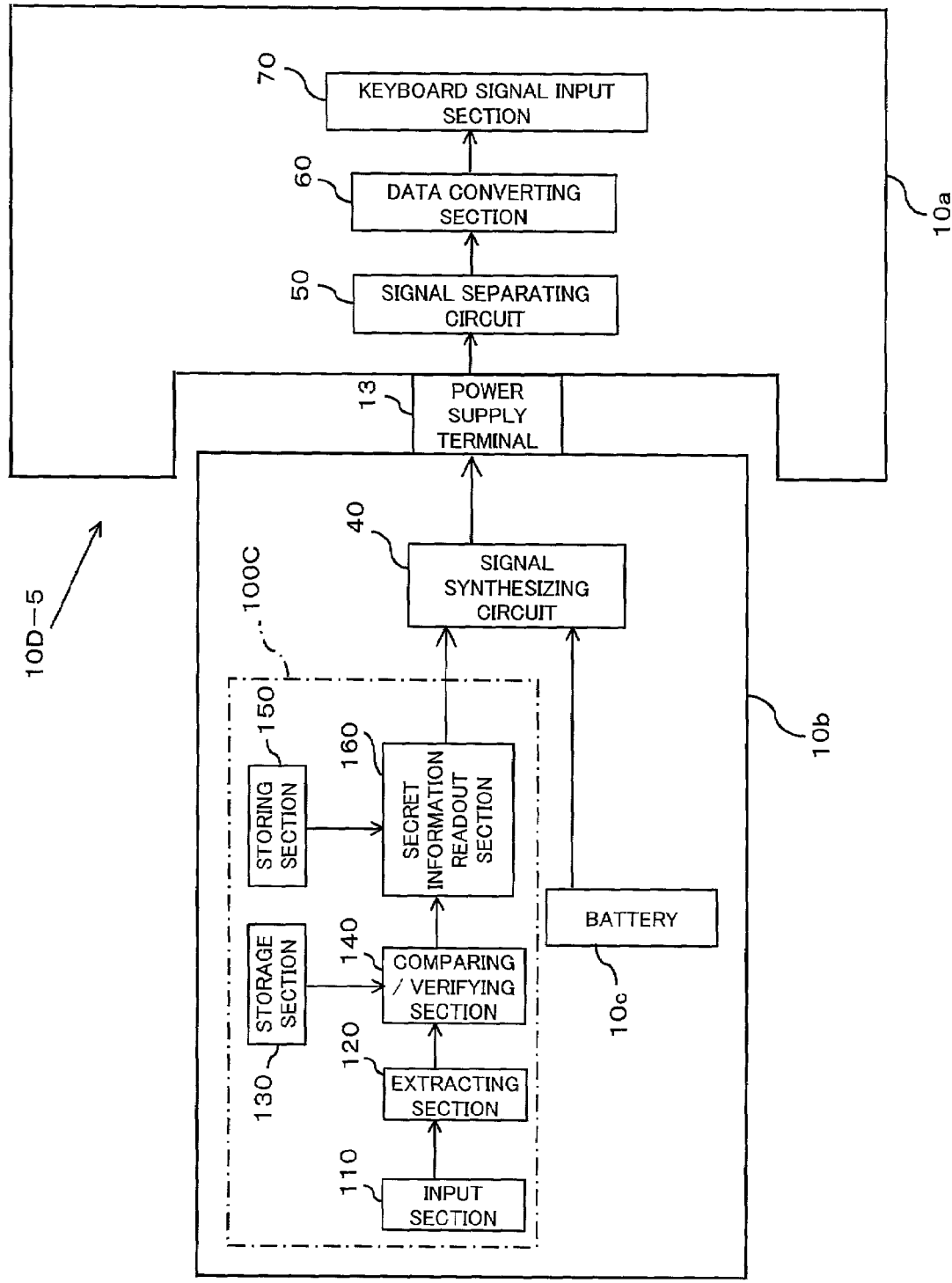
FIG. 18 is a block diagram schematically showing the mobile electronic apparatus of a fifth modification of the fourth embodiment.

FIG. 18 shows a fifth modification of the mobile electronic apparatus of the fourth embodiment. The mobile electronic apparatus 10D-5 of FIG. 18 has the user verifying section 100C of FIG. 17 to serve as the user verifying section 100 of the mobile electronic apparatus 10D-3 of FIG. 11. Like reference numbers designate similar parts or elements throughout several views, so their detailed description is omitted here.

With this construction of the mobile electronic apparatus 10D-5, the personal data, which is readout by the personal data read-out section 160 of the user verifying section 100C, is sent from the battery pack 10b to the main body 10a via the power supply terminal (DC terminal) 13, which is electrically connected between the battery pack 10b and the main body 10a for supplying electric power from the battery 10c to the main body 10a.

Precisely, the personal data readout from the user verifying section 100C is carried onto an output voltage of the battery 10c by the signal synthesizing circuit 40 as data signal in the form of an FM modulation signal or an AM modulation signal to produce a synthesized signal, which is then sent to the main body 10a via the power supply terminal 13. On the main body 10a side, the synthesized signal received from the battery pack 10b is separated into a power supply component and a data signal component by the signal separating circuit 50.

The thus separated data signal, or the personal data, is converted into a key-pattern signal (keyboard signal) having a predetermined form, by the data converting section 60 before being input to the keyboard signal input section 70.

Hereby, since it is possible to keep the compatibility between the personal data from the user verifying section 100C and the input data signal input through the keys (push/press buttons) of the main body 10a, the personal data, such as a password, from the user verifying section 100C can be input to the keyboard signal input section 70 without being discriminated from the above-mentioned keyboard signal input through the keys.

In this manner, the mobile electronic apparatus 10D-5 becomes operable to manage and preserve the authorized user's personal data stored in the storing section 150 by fingerprint verification. Namely, it is possible to protect and guard the personal data by verifying a user with fingerprint information, which is free from being stolen or faked by an unauthorized user. For example, the user must be verified using fingerprint information before sending the personal data to the main body 10a, thereby an access to the personal data is permitted in the main body 10a, thus guaranteeing a highest degree of security.

Therefore, it is possible to associate the storing section 150, which is guarded by user verification with fingerprint information, with the mobile electronic apparatus 10D-5 in a simple manner, namely, only by replacing the existing battery pack, which is detachably attached, with another battery pack 10b to which the user verifying section 100C is equipped, without the risk of impairing the mobility of the mobile electronic apparatus 10D-5 and without making any modification to hardware of the main body 10a of the mobile electronic apparatus 10D-5, thereby providing significantly improved user friendliness.

At that time, since the personal data is carried onto a power supply voltage by the signal synthesizing circuit 40, and is then, on the main body 10a side, separated and picked up from the voltage by the signal separating circuit 50, the power supply terminal 13 of the battery pack 10b can serve as both a power supply and an interface at the same time, thus making it possible to transmit the personal data from the battery pack 10b to the main body 10a side without making any change in the present construction. It is thus resultantly possible to add an additional function, or user verification, to the existing mobile electronic apparatus, without the need for an interface newly equipped in hardware, or without making any change in the design of the mobile electronic apparatus.

(5) Various Other Modifications

The present invention should by no means be limited to the above-illustrated embodiments, and various changes or modifications may be suggested without departing from the gist of the invention.

In the above description of the fourth embodiment, fingerprints are used as an example of biometric information. Alternative types of biometric information may be used; for example, iris, retina, palmprint, hand shape, voiceprint, facial recognition, signature dynamics, blood vessel pattern, key strokes may be either individually or in any combination.

Further, as substitute for biometric information, a single-sign-on verification using a long password may be employed so that the long password can be used for verifying a user when the biometric information cannot be used for a reason.

And further, although the attachment part of the mobile electronic apparatus is a battery pack in the above embodiments, the present invention should by no means limited to this.

What is claimed is:

1. A mobile phone which is able to be carried by an authorized user for performing various electronic information processes, comprising:
   a main body;
   a battery pack detachably attached to the main body for supplying power thereto, said battery pack having an input/output section integrally formed therewith for performing a user verification function using biometric information of a user of the mobile phone input via the input/output section, wherein said user verification function verifies the identity of an authorized user of the mobile phone based on the inputted biometric information; and
   an optical communications means for transferring signals relating to the inputted biometric information between said main body and the battery pack, said optical communication means comprising:
   a light emitting module provided for the battery pack, and
   a light receiving module provided for the main body and opposing the light emitting module while the battery pack is attached to the main body, to directly receive light emitted from the light emitting module,
   wherein, to transfer signals relating to the inputted biometric information from the battery pack and the main body, the light emitting module emits light and the light receiving module directly receives the emitted light while the battery pack is attached to the main body.

2. A mobile phone comprising:
   a main body of the mobile phone;
   a battery pack detachably attached to the main body for supplying power to the main body, the battery pack having an input/output section to input information to the battery pack from outside of the mobile phone, and to output information from the battery pack to outside of the mobile phone; and
   an interface section comprising an optical communication means for providing communications between the main body and the battery pack, wherein the battery pack and the interface section operate together to allow biometric information of a user of the mobile phone to be input to the main body from outside of the mobile phone to provide a user verification function to verify the identity of an authorized user of the mobile phone utilizing the biometric information being input to the battery pack through the input/output section and then being input to the main body via communication between the battery pack and the interface section, and to allow information to be output from the main body to outside of the mobile phone by being output from the main body to the battery pack via communication between the interface section and the battery pack and then being output from the battery pack to outside of the mobile phone through the input/output section,
   said optical communication means comprising:
   a light emitting module provided for the battery pack, and
   a light receiving module provided for the main body and opposing the light emitting module while the battery pack is attached to the main body, to directly receive light emitted from the light emitting module.
   wherein, to cause the biometric information being input to the battery pack through the input/output section to be input to the main body, the light emitting module emits light and the light receiving module directly receives the emitted light while the batten pack is attached to the main body.

3. A mobile phone as in claim 2, wherein information input to the main body from outside of the mobile phone by being input to the battery pack provides additional functionality to the mobile phone.

4. The mobile phone according to claim 2, wherein the battery pack contains a processor for utilizing the biometric information to provide the user verification function.

5. The mobile phone according to claim 4, wherein the battery pack contains a memory for storing personal data of an authorized user of the mobile phone.

6. The mobile phone according to claim 5, wherein the processor compares the personal data stored in the memory with the biometric information of a user of the mobile phone that is input into the input/output section of the battery pack, to provide the user verification function.

7. The mobile phone according to claim 4, wherein the battery pack communicates a result of the user verification function to the main body of the mobile phone.

8. A mobile phone comprising:
   a main body;
   a battery pack, detachably attached to the main body, supplying power to the main body, the battery pack comprising an input section integrally formed with the battery pack; and
   an interface section, disposed on a contact surface between the battery pack and the main body, optically transmitting signals between the main body and the battery pack, the interface section comprising
   a light emitting module provided for the battery pack, and
   a light receiving module provided for the main body and opposing the light emitting module while the batten pack is attached to the main body, to directly receive light emitted from the light emitting module while the battery pack is attached to the main body,
   wherein biometric information of a user of the mobile phone is input to the input section of the battery pack, and the main body and the battery pack communicate via signals optically transmitted between the main body and the battery pack by the interface section with the light emitting module emitting light and the light receiving module directly receiving the emitted light while the battery pack is attached to the main body to thereby optically transmit signals from the battery pack to the main body, so that the mobile phone verifies whether the user is an authorized user of the mobile phone based on the inputted biometricinformation.

9. A mobile phone comprising:
   a main body;
   a battery pack, detachably attached to the main body, supplying power to the main body, and having an input section;
   a first light emitting module on the battery pack;
   a first light receiving module on the main body and positioned so that, when the battery pack is attached to the main body, the first tight receiving module directly receives light emitted by the first light emitting module;
   a second light emitting module on the main body;
   a second light receiving module on the battery pack and positioned so that, when the battery pack is attached to the main body, the second light receiving module directly receives light emitted by the second light emitting module;
   wherein biometric information of a user of the mobile phone is input to the input section of the battery pack, and optical signals related to the inputted biometric information are transmitted from the battery pack to the main body by emitting light from the first light emitting module and directly receiving the emitted light by the first light receiving module while the battery pack is attached to the main body, and optical signals related to the inputted biometric information are transmitted from the main body to the battery pack by emitting light from the second light emitting module and directly receiving the emitted light by the second light receiving module while the battery pack is attached to the main body, so that the mobile phone verifies whether the user is an authorized user of the mobile phone based on the inputted biometric information.

* * * * *